US010185388B2

(12) United States Patent
Aonuma et al.

(10) Patent No.: US 10,185,388 B2
(45) **Date of Patent: *Jan. 22, 2019**

(54) HEAD MOUNTED DISPLAY, DISPLAY SYSTEM, CONTROL METHOD OF HEAD MOUNTED DISPLAY, AND COMPUTER PROGRAM

(71) Applicant: SEIKO EPSON CORPORATION, Tokyo (JP)

(72) Inventors: Masashi Aonuma, Shiojiri (JP); Masahide Takano, Matusmoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,937

(22) Filed: Jul. 24, 2017

(65) Prior Publication Data

US 2018/0004282 A1 Jan. 4, 2018

Related U.S. Application Data

(63) Continuation of application No. 14/919,231, filed on Oct. 21, 2015, now Pat. No. 9,746,914.

(30) Foreign Application Priority Data

Nov. 17, 2014 (JP) ................................ 2014-232342
May 22, 2015 (JP) ................................ 2015-104284

(51) Int. Cl.
*G06K 9/00* (2006.01)
*G06F 3/01* (2006.01)
(Continued)

(52) U.S. Cl.
CPC ........... *G06F 3/011* (2013.01); *G02B 27/017* (2013.01); *G06F 3/0487* (2013.01); *G06F 9/453* (2018.02);
(Continued)

(58) Field of Classification Search
CPC ...... G02B 13/16; G02B 27/017; G02B 27/01; G02B 27/0172; G02B 27/0093;
(Continued)

(56) References Cited

U.S. PATENT DOCUMENTS 6,411,326 B1 6/2002 Tabata
6,738,040 B2 5/2004 Jahn et al.
(Continued)

FOREIGN PATENT DOCUMENTS

EP 1 182 541 A2 2/2002
EP 2 600 331 A1 6/2013
(Continued)

OTHER PUBLICATIONS

Jan. 19, 2017 Office Action Issued in U.S. Appl. No. 14/919,231.
(Continued)

*Primary Examiner* — Jose L Couso
(74) *Attorney, Agent, or Firm* — Oliff PLC

(57) ABSTRACT

A transmission-type head mounted display includes a detection unit that detects a first target from outside scenery, an image display unit which is capable of transmitting the outside scenery and is capable of displaying an image, and a display image setting unit that causes the image display unit to display a first moving image which is a moving image associated with the detected first target.

21 Claims, 25 Drawing Sheets

(51) Int. Cl.
*G06F 9/451* (2018.01)
*G06F 3/0487* (2013.01)
*G02B 27/01* (2006.01)

(52) U.S. Cl.
CPC .................. *G02B 2027/014* (2013.01); *G02B 2027/0138* (2013.01)

(58) Field of Classification Search
CPC ........ G02B 27/2228; G02B 2027/0134; G02B 2027/0143; G02B 2027/0156; G02B 2027/0136; G02B 2027/0138; G02B 2027/0187; G02B 2027/0178; G02B 2027/0123; G02B 2027/0181; G02B 2027/0127; G02B 2027/014; G02B 21/22; G02B 21/367; G02B 2027/0141; G02B 2027/2027; G06F 1/163; G06F 3/011; G06F 3/012; G06F 3/013; G06F 3/017; G06F 3/021; G06F 3/04815; G06F 3/005; G06F 3/04842; G06F 3/14; G06F 3/147; G06F 3/167; G06F 21/32; G06F 21/36; G08G 1/166; G08G 1/165; G08G 1/161; G08G 1/167; H04N 1/00129; H04N 1/00212; H04N 1/00564; H04N 5/23219; H04N 5/2253; H04N 5/23229; H04N 5/23293; H04N 5/2621; H04N 7/15; H04N 13/044; H04N 13/0014; H04N 13/0022; H04N 13/0029; H04N 13/0044; H04N 13/0055; H04N 13/0059; H04N 13/0221; H04N 13/0239; H04N 13/0275; H04N 13/004; H04N 13/0203; H04N 13/0278; H04N 13/0484; H04N 21/21805; H04N 2213/002; H04N 2213/007; H04N 5/225; H04N 5/77; H04N 5/783; H04N 5/23267; H04N 5/2628; H04N 5/272; H04N 13/344; H04N 13/0468; H04N 21/42208; A61B 5/14552; A61B 5/6803; A61B 6/022; A61B 8/462; A61B 8/463; G06K 9/00805; G06K 9/00208; G06K 9/00671; G06K 9/00791; G06K 9/00798; G06K 9/46; G06K 9/00604; G06K 9/00664; G06K 9/3233; G06K 9/00744; G05B 15/02; G05B 2219/32014; G06T 11/206; G06T 19/006; G06T 1/0007; G06T 2200/04; G06T 7/20; G06T 2207/10004; G06T 11/60; G09B 19/00; G09B 5/06; G01J 5/041; G01J 5/08; G01J 5/0806; G01J 5/0843; G01J 5/0859
See application file for complete search history.

(56) References Cited

U.S. PATENT DOCUMENTS 8,669,919 B2 * 3/2014 Ono .................... G02B 27/017 345/8
9,535,248 B2 1/2017 Hirabayashi et al.
9,800,840 B2 * 10/2017 Sako ...................... H04N 7/181
2002/0089544 A1 7/2002 Jahn et al.
2005/0031166 A1 2/2005 Fujimura et al.
2010/0164990 A1 7/2010 Van Doorn
2011/0260967 A1 10/2011 Matsushima
2013/0083063 A1 4/2013 Geisner et al.
2013/0088413 A1 4/2013 Raffle et al.
2014/0049558 A1 2/2014 Krauss et al.
2014/0168266 A1 6/2014 Kimura
2014/0176603 A1 6/2014 Kumar et al.
2014/0204021 A1 7/2014 Sugihara et al.
2014/0300633 A1 10/2014 Sako et al.
2014/0310595 A1 10/2014 Acharya et al.
2015/0103174 A1 4/2015 Emura et al.
2015/0293362 A1 * 10/2015 Takahashi .............. G02B 27/02 348/47
2015/0363979 A1 12/2015 Takano et al.
2015/0370072 A1 * 12/2015 Lee .................... G02B 27/0172 345/8
2016/0086306 A1 * 3/2016 Nishimaki ................ G06T 3/40 345/620
2016/0282618 A1 * 9/2016 Kon ........................ G06F 3/011
2016/0330410 A1 11/2016 Sako et al.
2017/0097675 A9 * 4/2017 Sako ....................... G06F 3/005
2017/0109916 A1 4/2017 Kurz et al.
2017/0140457 A1 * 5/2017 Kaku ...................... G06F 3/017
2017/0318235 A1 * 11/2017 Schneider .......... G02B 27/2228

FOREIGN PATENT DOCUMENTS

JP H08-75418 A 3/1996
JP 2002-230086 A 8/2002
JP 2007-514211 A 5/2007
JP 2009-505268 A 2/2009
JP 2010-164814 A 7/2010
JP 2012-196241 A 10/2012
JP 2014-137522 A 7/2014
JP 2014-155207 A 8/2014
JP 2014-203377 A 10/2014
JP 5764994 B2 8/2015

OTHER PUBLICATIONS

Apr. 12, 2016 Extended Search Report issued in European Patent Application No. 15198728.6.
Jan. 17, 2017 Office Action Issued in U.S. Appl. No. 14/952,185.
May 2, 2017 Office Action issued in U.S. Appl. No. 14/952,185.
Anonymous: "Prefetching—Wikipedia", Apr. 23, 2013(Apr. 23, 2013 XP055363478, Retrieved from the Internet: URL: https:llde.wikipedia.org/w/index.php?title=Prefetching&0ldid=117815937.
Oct. 12, 2017 Notice of Allowance Issued in U.S. Appl. No. 14/952,185.

* cited by examiner

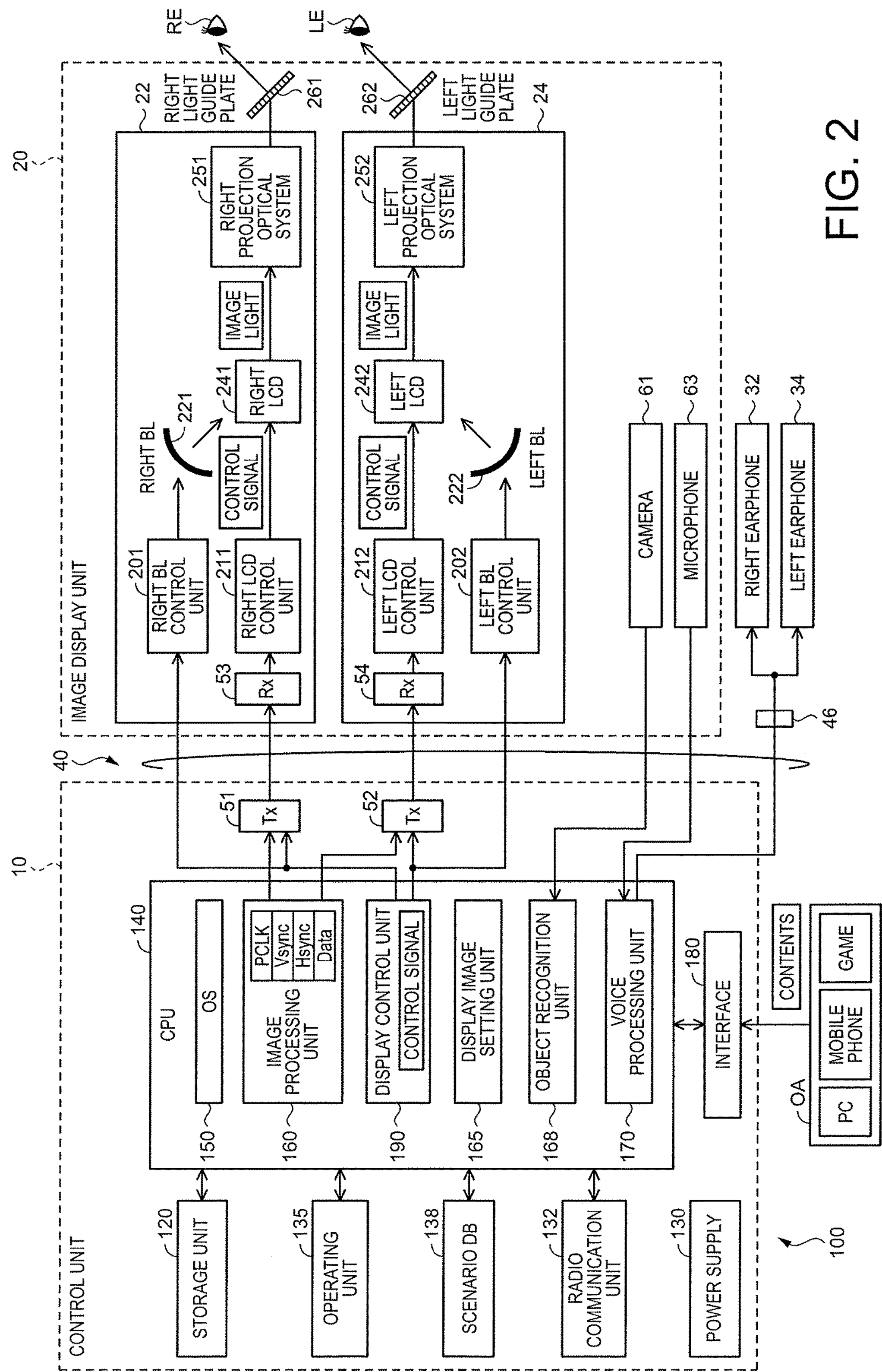

IMAGE DISPLAY UNIT
RIGHT BL CONTROL UNIT
RIGHT LCD CONTROL UNIT
RIGHT BL
CONTROL SIGNAL
RIGHT LCD
IMAGE LIGHT
RIGHT PROJECTION OPTICAL SYSTEM
RIGHT LIGHT GUIDE PLATE
RE
LEFT LCD CONTROL UNIT
LEFT BL CONTROL UNIT
CONTROL SIGNAL
LEFT LCD
LEFT BL
IMAGE LIGHT
LEFT PROJECTION OPTICAL SYSTEM
LEFT LIGHT GUIDE PLATE
LE
Rx
Tx
CAMERA
MICROPHONE
RIGHT EARPHONE
LEFT EARPHONE
CONTROL UNIT
CPU
OS
IMAGE PROCESSING UNIT
PCLK
Vsync
Hsync
Data
DISPLAY CONTROL UNIT
CONTROL SIGNAL
DISPLAY IMAGE SETTING UNIT
OBJECT RECOGNITION UNIT
VOICE PROCESSING UNIT
INTERFACE
CONTENTS
OA
PC
MOBILE PHONE
GAME
STORAGE UNIT
OPERATING UNIT
SCENARIO DB
RADIO COMMUNICATION UNIT
POWER SUPPLY
FIG. 2

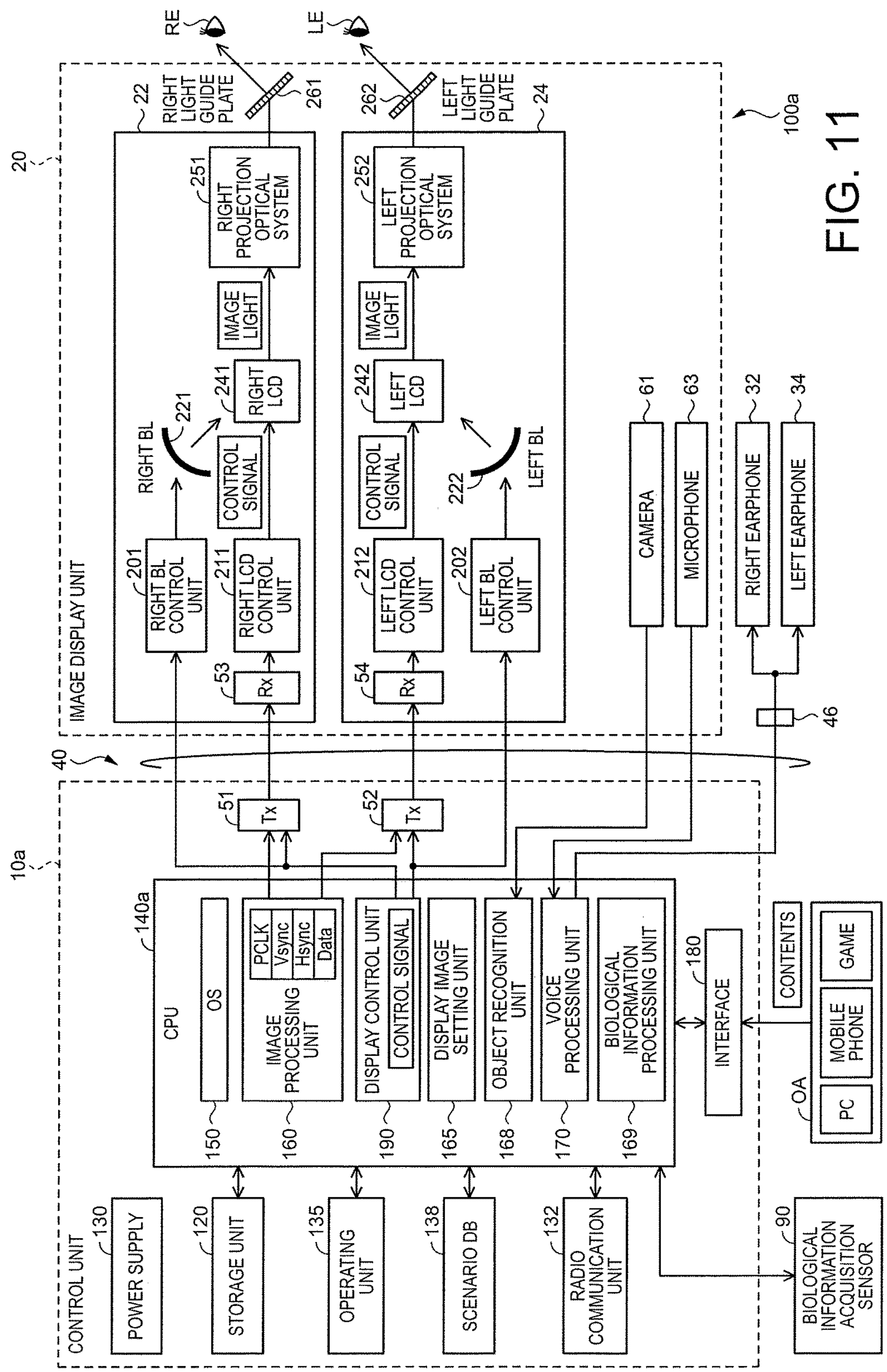

IMAGE DISPLAY UNIT
RIGHT BL CONTROL UNIT
RIGHT LCD CONTROL UNIT
RIGHT BL
CONTROL SIGNAL
RIGHT LCD
IMAGE LIGHT
RIGHT PROJECTION OPTICAL SYSTEM
RIGHT LIGHT GUIDE PLATE
LEFT LCD CONTROL UNIT
LEFT BL CONTROL UNIT
LEFT BL
LEFT LCD
LEFT PROJECTION OPTICAL SYSTEM
LEFT LIGHT GUIDE PLATE
RE
LE
Rx
Tx
CAMERA
MICROPHONE
RIGHT EARPHONE
LEFT EARPHONE
CONTROL UNIT
POWER SUPPLY
STORAGE UNIT
OPERATING UNIT
SCENARIO DB
RADIO COMMUNICATION UNIT
CPU
OS
IMAGE PROCESSING UNIT
PCLK
Vsync
Hsync
Data
DISPLAY CONTROL UNIT
DISPLAY IMAGE SETTING UNIT
OBJECT RECOGNITION UNIT
VOICE PROCESSING UNIT
BIOLOGICAL INFORMATION PROCESSING UNIT
INTERFACE
CONTENTS
GAME
MOBILE PHONE
PC
OA
BIOLOGICAL INFORMATION ACQUISITION SENSOR
FIG. 11

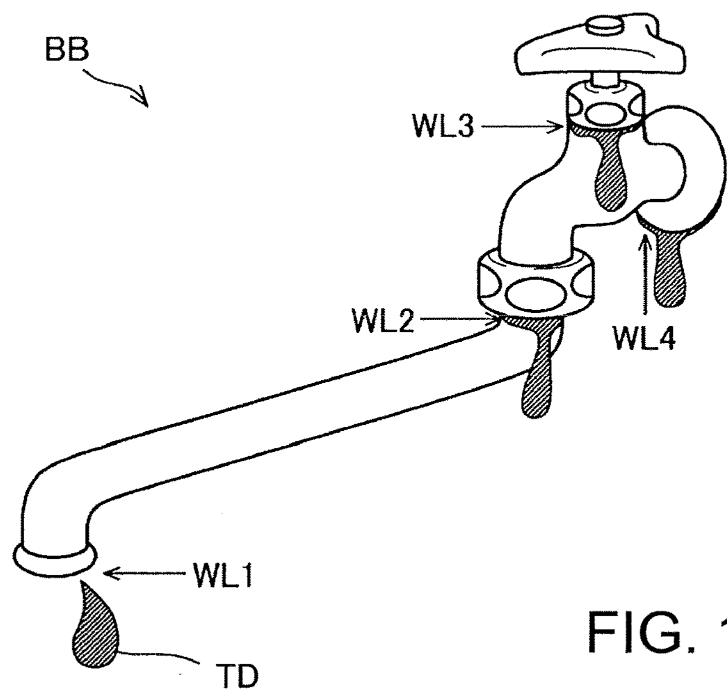
FIG. 17
FIG. 18
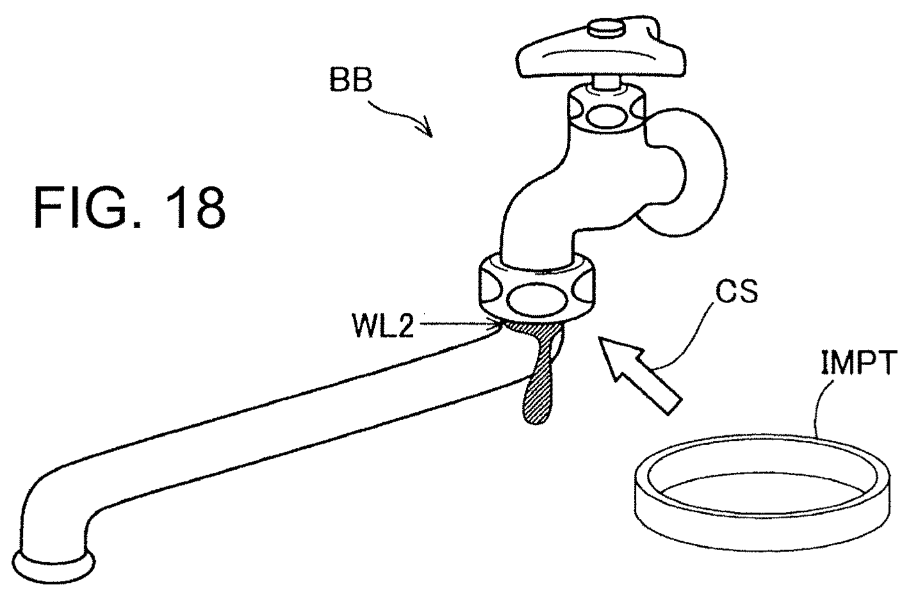

HEAD MOUNTED DISPLAY, DISPLAY SYSTEM, CONTROL METHOD OF HEAD MOUNTED DISPLAY, AND COMPUTER PROGRAM

This is a Continuation of U.S. application Ser. No. 14/919,231 filed Oct. 21, 2015, which claims the benefit of priority of Japanese Application Nos. 2015-104284 and 2014-232342 filed May 22, 2015 and Nov. 17, 2014, respectively. The disclosure of the prior applications are hereby incorporated by reference herein in their entirety.

BACKGROUND

1. Technical Field

The present invention relates to a head mounted display.

2. Related Art

Head mounted displays (HMD) which are display devices mounted on a head have been known. The head mounted displays, for example, generate image light using a liquid crystal display and a light source, and guide the generated image light to a user's eyes using a projection optical system or a light guide plate, to thereby cause a user to visually recognize a virtual image. In the head mounted display, there are two types of a transmission type in which a user is able to visually recognize outside scenery in addition to a virtual image and a non-transmission type in which a user is not able to visually recognize the outside scenery. There are an optical transmission type and a video transmission type in the transmission-type head mounted display.

JP-A-8-75418 discloses a method of automatically recognizing an object in which a stationary object remaining stationary in a predetermined range is irradiated with ultrasonic waves, to acquire distance information from an ultrasonic sensor that performs irradiation with ultrasonic waves to the stationary object, and to acquire a stereoscopic image of the stationary object on the basis of the distance information. In addition, JP-A-2011-60462 discloses an analysis system of a golf club in which a sensor unit that acquires data of an inertial sensor is mounted on a head of the golf club, and an analysis processing device which is connected to the golf club through radio communication analyzes the data acquired by the inertial sensor when a user swings the golf club.

However, a technique disclosed in JP-A-8-75418 has a problem in that a stereoscopic image of only one stationary object can be recognized, and that stereoscopic images of a moving object or a plurality of objects are desired to be recognized. In addition, a technique disclosed in JP-A-2011-60462 has a problem in that the inertia data of the golf club on which the sensor unit is mounted can be acquired, but data of movement or the like regarding an object on which the sensor is not mounted is not able to be acquired, and these pieces of data are thus desired to be acquired. Besides, in the head mounted displays of the related art, an improvement in usability or the like has been required.

SUMMARY

An advantage of some aspects of the invention is to solve the problems described above, and the invention can be implemented as the following forms.

(1) An aspect of the invention provides a transmission-type head mounted display. The head mounted display includes a detection unit that detects a first target from outside scenery, an image display unit which is capable of transmitting the outside scenery and is capable of displaying an image, and a display image setting unit that causes the image display unit to display a first moving image which is a moving image associated with the detected first target. According to the head mounted display of this aspect, since a user is able to perform work or the like while visually recognizing a moving image which is displayed in accordance with an actual object capable of being transmitted and visually recognized, it is possible to improve the efficiency of a user's work or the like.

(2) In the head mounted display of the aspect, the display image setting unit may display the first moving image in association with a position of the detected first target. According to the head mounted display of this aspect, since a user can perform work or the like while visually recognizing a moving image which is displayed in accordance with the position of a real object, it is possible to further improve the efficiency of a user's work or the like.

(3) In the head mounted display of the aspect, the detection unit may capture an image of the outside scenery, and detects the first target in a captured image. According to the head mounted display of this aspect, since the first target is detected as an image, it is possible to improve the accuracy of detection of the first target.

(4) In the head mounted display of the aspect, the first moving image may be a moving image relevant to work which is performed on the detected first target. According to the head mounted display of this aspect, a user more easily recognizes the recommended operation of work, and thus it is possible to further improve the efficiency of a user's work or the like.

(5) In the head mounted display of the aspect, the detection unit may detect a second target different from the first target from the outside scenery, and when the second target is detected during the display of the first moving image on the image display unit, the display image setting unit may cause the image display unit to display a second moving image which is a moving image different from the first moving image associated with the second target, instead of the first moving image. According to the head mounted display of this aspect, since an image appropriate to a situation is able to be visually recognized by a user appropriately, a user's usability is further improved.

(6) In the head mounted display of the aspect, the second moving image may be a moving image relevant to work which is recommended to a user next to work which is recommended by the first moving image. According to the head mounted display of this aspect, when work according to a plurality of procedures is desired to be performed by a user, a moving image is visually recognized by a user in accordance with the detected different target, and thus the depth of understanding of a user's work is improved, and a user's convenience is improved.

(7) In the head mounted display of the aspect, the second moving image may be a moving image indicating that the detected second target is not a target to be used for work which is recommended to a user by the first moving image. According to the head mounted display of this aspect, a target which is not to be used for recommended work is visually recognized by a user, and thus the recommended work is able to be recognized, and a user's convenience is improved.

(8) The head mounted display of the aspect may further include a voice acquisition unit that acquires an external voice. The display image setting unit may cause the image display unit to display the first moving image on the basis of a combination of the detected first target and the acquired voice. According to the head mounted display of this aspect, since a user can operate the first moving image in addition to the detected first target, a user's usability is further improved.

(9) The head mounted display of the aspect may further include a voice output unit that outputs a voice associated with the first moving image when the first moving image is displayed on the image display unit. According to the head mounted display of this aspect, since information is able to be recognized by a user through a voice in addition to the first moving image, and a user is able to recognize a great deal of information depending on the sense of sight and the sense of hearing, a user's convenience is improved.

(10) The head mounted display of the aspect may further include a biological information acquisition unit that acquires biological information of a user. The display image setting unit may cause the image display unit to display the first moving image on the basis of the detected first target and the acquired biological information of a user. According to the head mounted display of this aspect, since a moving image obtained by adding the acquired biological information of a user to the detected first target is able to be visually recognized by a user, a user's convenience is further improved.

(11) In the head mounted display of the aspect, association of the first target with the first moving image may be a combination of the first moving image and at least one of a kind of the detected first target, a movement of the first target, a position of the first target in the outside scenery, and a direction of the first target. According to the head mounted display of this aspect, since various moving images are selected by a plurality of elements, a user is able to simply select a desired moving image from various moving images.

Not all of a plurality of components included in the respective aspects of the invention described above are essential. In order to solve some or all of the aforementioned problems, or to achieve some or all of the effects described in this specification, regarding some components of the plurality of components, it is possible to appropriately perform change, deletion, replacement with other new components, and deletion of a portion of limited contents. Further, in order to solve some or all of the aforementioned problems, or to achieve some or all of the effects described in this specification, some or all of the technical features included in the aspect of the invention described above can also be combined with some or all of the technical features included in other aspects of the invention, to thereby form an independent aspect of the invention.

For example, an aspect of the invention can be implemented as a device including one or two or more of three elements of the detection unit, the image display unit, and the display image setting unit. That is, this device may or may not include the detection unit. In addition, the device may or may not include the image display unit. In addition, the device may or may not include the display image setting unit. The detection unit may detect, for example, the first target from the outside scenery. The image display unit may be, for example, capable of transmitting the outside scenery and be capable of displaying an image. The display image setting unit may cause, for example, the image display unit to display the first moving image which is a moving image associated with the detected first target. Such a device is able to be implemented as, for example, the head mounted display, but is also able to be implemented as devices other than the head mounted display. According to such an aspect, it is possible to solve at least one of various problems such as an improvement and simplification in the operability of the device, the integration of the device, and an improvement in a user's convenience during the use of the device. Some or all of the technical features of each aspect the head mounted display described above can be applied to this device entirely.

The invention can also be embodied in various forms other than the head mounted display. For example, the invention can be embodied in a form of a computer program for implementing a display system, a method and an information system of controlling a head mounted display, an information system including a head mounted display, a method of controlling a head mounted display, a recording medium having the computer program recorded thereon, and a data signal in which the computer program is contained and embodied within carrier wave.

BRIEF DESCRIPTION OF THE DRAWINGS

The invention will be described with reference to the accompanying drawings, wherein like numbers reference like elements.

FIG. 2 is a functional block diagram illustrating of a configuration of the HMD.

FIG. 11 is a functional block diagram illustrating a configuration of an HMD of a second embodiment.

FIG. 17 is a diagram illustrating an example of an image which is displayed when one AR scenario to be executed is selected from a plurality of AR scenarios.

FIG. 18 is a diagram illustrating an example of an image after selection which is displayed after one AR scenario is selected.

DESCRIPTION OF EXEMPLARY EMBODIMENTS

A. First Embodiment

A-1. Configuration of Head Mounted Display (HMD)

Figure 1:
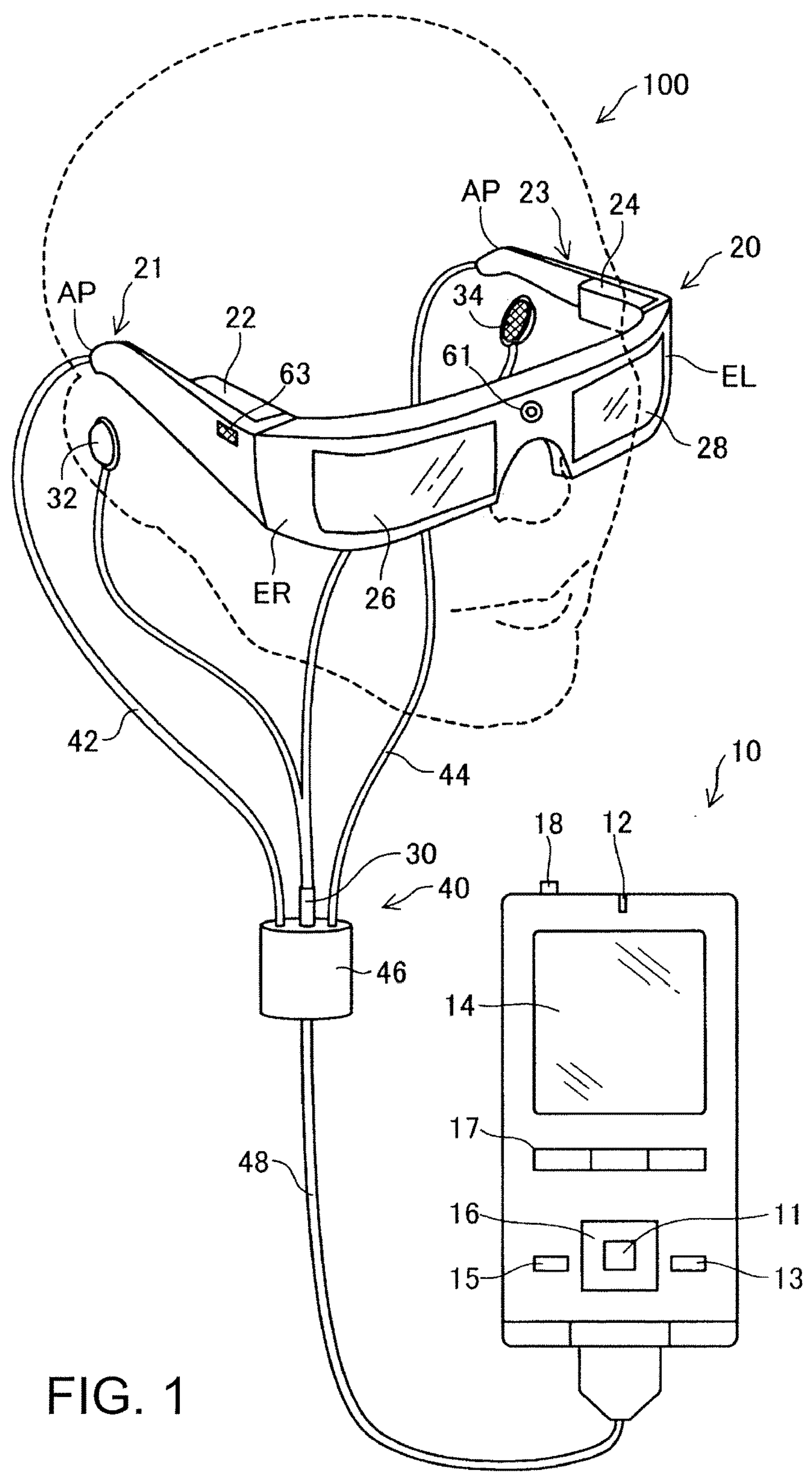
FIG. 1 is a diagram illustrating an appearance configuration of a head mounted display (HMD).

FIG. 1 is a diagram illustrating an appearance configuration of a head mounted display 100 (HMD 100). The HMD 100 is a display device which is mounted on a head, and is also called a head mounted display (HMD). The HMD 100 of the present embodiment is an optical transmission-type head mounted display in which a user visually recognizes a virtual image and is able to directly visually recognize outside scenery simultaneously. Meanwhile, in this specification, the virtual image which is visually recognized by a user through the HMD 100 is also called a "display image" for the sake of convenience.

The HMD 100 includes an image display unit 20 that allows a user to visually recognize a virtual image in a state of being mounted on a user's head, and a control unit 10 (controller 10) that controls the image display unit 20.

The image display unit 20 is a mounted body which is mounted on a user's head, and has a spectacles shape in the present embodiment. The image display unit 20 includes a right holding portion 21, a right display drive unit 22, a left holding portion 23, a left display drive unit 24, a right optical image display unit 26, a left optical image display unit 28, a camera 61, and a microphone 63. The right optical image display unit 26 and the left optical image display unit 28 are disposed so as to be located in front of a user's right and left eyes when a user wears the image display unit 20. One end of the right optical image display unit 26 and one end of the left optical image display unit 28 are connected to each other at a position corresponding to a user's glabella when the user wears the image display unit 20.

The right holding portion 21 is a member provided so as to extend from an end ER which is the other end of the right optical image display unit 26 to a position corresponding to a user's temporal region of the head when the user wears the image display unit 20. Similarly, the left holding portion 23 is a member provided so as to extend from an end EL which is the other end of the left optical image display unit 28 to a position corresponding to a user's temporal region of the head when the user wears the image display unit 20. The right holding portion 21 and the left holding portion 23 hold the image display unit 20 at a user's head like the temples (handles) of spectacles.

The right display drive unit 22 and the left display drive unit 24 are disposed at sides facing a user's head when the user wears the image display unit 20. Meanwhile, hereinafter, the right holding portion 21 and the left holding portion 23 are also called a "holding portion" collectively simply, the right display drive unit 22 and the left display drive unit 24 are also called a "display drive unit" collectively simply, and the right optical image display unit 26 and the left optical image display unit 28 are also called an "optical image display unit" collectively simply.

The display drive units 22 and 24 include liquid crystal displays 241 and 242 (hereinafter, also called "LCDs 241 and 242"), projection optical systems 251 and 252, and the like (see FIG. 2). The details of the configuration of the display drive units 22 and 24 will be described later. The optical image display units 26 and 28 as optical elements include light guide plates 261 and 262 (see FIG. 2) and a dimming plate. The light guide plates 261 and 262 are formed of an optically transmissive resin material or the like, and guide image light which is output from the display drive units 22 and 24, to a user's eyes. The dimming plate is a laminar optical element, and is disposed so as to cover the surface side of the image display unit 20 which an opposite side to a user's eyes. The dimming plate protects the light guide plates 261 and 262, and suppresses damage of light guide plates 261 and 262, adhesion of contaminants, and the like. In addition, the light transmittance of the dimming plate is adjusted, and thus it is possible to adjust a tendency to visually recognize a virtual image by adjusting the amount of outside light entering a user's eyes. Meanwhile, the dimming plate can be omitted.

The camera 61 is disposed at a position corresponding to a user's glabella when the user wears the image display unit 20. Therefore, the camera 61 captures an image of outside scenery which is an outside landscape in a user's eye direction in a state where the user wears the image display unit 20 on his/her head, and acquires the captured image. The camera 61 is a monocular camera, but may be a stereo camera.

The microphone 63 acquires an external voice. The microphone 63 is disposed on the opposite side (outside) to a side facing a user in the right display drive unit 22 when the user wears the image display unit 20. Meanwhile, the microphone 63 is equivalent to a voice acquisition unit in the aspect of the invention.

The image display unit 20 further includes a connection unit 40 for connecting the image display unit 20 to the control unit 10. The connection unit 40 includes a main cord 48 connected to the control unit 10, a right cord 42, a left cord 44, and a connection member 46. The right cord 42 and the left cord 44 are cords obtained by branching the main cord 48 into two pieces. The right cord 42 is inserted into a housing of the right holding portion 21 from an apical portion AP of the right holding portion 21 in an extending direction, and is connected to the right display drive unit 22. Similarly, the left cord 44 is inserted into a housing of the left holding portion 23 from an apical portion AP of the left holding portion 23 in an extending direction, and is connected to the left display drive unit 24. The connection member 46 is provided at a branch point between the main cord 48, and the right cord 42 and the left cord 44, and has a jack for connecting an earphone plug 30. A right earphone 32 and a left earphone 34 extend from the earphone plug 30.

The image display unit 20 and the control unit 10 perform the transmission of various signals through the connection unit 40. The end of the main cord 48 on the opposite side to the connection member 46, and the control unit 10 are provided with connectors (not shown) which are fitted to each other. The control unit 10 and the image display unit 20 are connected to each other or disconnected from each other by fitting/fitting release between the connector of the main cord 48 and the connector of the control unit 10. A metal cable or an optical fiber, for example, can be adopted in the right cord 42, the left cord 44, and the main cord 48.

The control unit 10 is a device for controlling the HMD 100. The control unit 10 includes a determination key 11, a lighting portion 12, a display switching key 13, a track pad 14, a luminance switching key 15, a direction key 16, a menu key 17, and a power supply switch 18. The determination key 11 detects a pressing operation, and outputs a signal for determining a content of an operation in the control unit 10. The lighting portion 12 gives notice of the operation state of the HMD 100 depending on the light-emitting state thereof. The operation state of the HMD 100 includes, for example, ON/OFF of a power supply, or the like. As the lighting portion 12, for example, an LED is used. The display switching key 13 detects a pressing operation, and outputs, for example, a signal for switching a display mode of a content moving image to 3D and 2D. The track pad 14 detects an operation of a user's finger on the operation surface of the track pad 14, and outputs a signal according to a detected content. As the track pad 14, various track pads of an electrostatic type, a pressure detection type, or an optical type can be adopted. The luminance switching key 15 detects a pressing operation, and outputs a signal for increasing or decreasing the luminance of the image display unit 20. The direction key 16 detects a pressing operation of a key corresponding to a vertical and horizontal direction, and outputs a signal according to a detected content. The power supply switch 18 switches the power-on state of the HMD 100 by detecting the slide operation of the switch.

FIG. 2 is a functional block diagram illustrating of a configuration of the HMD 100. As shown in FIG. 2, the control unit 10 includes a storage unit 120, a power supply 130, an operating unit 135, a radio communication unit 132, a scenario database 138 (scenario DB 138), a CPU 140, an interface 180, a transmission unit 51 (Tx 51) and a transmission unit 52 (Tx 52). The operating unit 135 accepts a user's operation, and is constituted by the determination key 11, the display switching key 13, the track pad 14, the luminance switching key 15, the direction key 16, the menu key 17, and the power supply switch 18.

The power supply 130 supplies power to each unit of the HMD 100. As the power supply 130, for example, a secondary battery can be used. The radio communication unit 132 performs radio communication with other devices such as, for example, a content server, a television, or a personal computer, on the basis of a predetermined wireless communication standard such as a wireless LAN or Bluetooth.

The storage unit 120 is constituted by a ROM, a RAM or the like. Various computer programs are stored in the ROM of the storage unit 120. The CPU 140 described later reads various types of computer programs from the ROM of the storage unit 120, and stores the programs in the RAM of the storage unit 120, to execute various types of computer programs.

The scenario DB 138 stores AR scenarios which are a plurality of moving images including an AR (Augmented Reality) image. The AR scenario in the present embodiment is a moving image including an AR image which is displayed on the image display unit 20 or a voice which is output through the earphones 32 and 34 when a specific target which is set in advance from a captured image of the camera 61 is detected. In other embodiments, simply, data including some kind of moving image can be regarded as an AR scenario, and a moving image included in the AR scenario may be a pop-up such as a text image. The scenario DB 138 stores a plurality of AR scenarios which are classified into several categories. The classified categories include, for example, cooking, home appliance handling, schedule management, and the like. Meanwhile, the HMD 100 can also execute not only the AR scenarios which are stored in the scenario DB 138, but also AR scenarios which are received from other devices through the radio communication unit 132.

The CPU 140 reads out and executes a computer program which is stored in the ROM of the storage unit 120, and thus functions as an operating system 150 (OS 150), a display control unit 190, a voice processing unit 170, an image processing unit 160, a display image setting unit 165, and, an object recognition unit 168.

The display control unit 190 generates a control signal for controlling the right display drive unit 22 and the left display drive unit 24. Specifically, the display control unit 190 individually controls drive ON/OFF of the right LCD 241 by a right LCD control unit 211, drive ON/OFF of a right backlight 221 by a right backlight control unit 201, drive ON/OFF of the left LCD 242 by a left LCD control unit 212, drive ON/OFF of a left backlight 222 of a left backlight control unit 202, and the like, through the control signal. Thereby, the display control unit 190 controls the generation and emission of image light by each of the right display drive unit 22 and the left display drive unit 24. For example, the display control unit 190 generates image light in both the right display drive unit 22 and the left display drive unit 24, generates image light in only one of the display drive units, or does not generate image light in both of the display drive units. Meanwhile, the generation of image light is also referred to as "image display".

The display control unit 190 transmits each control signal for the right LCD control unit 211 and the left LCD control unit 212 through the transmission units 51 and 52. In addition, the display control unit 190 transmits each control signal for the right backlight control unit 201 and the left backlight control unit 202.

The image processing unit 160 acquires an image signal included in content, and transmits the acquired image signal to receiving units 53 and 54 of the image display unit 20 through the transmission units 51 and 52. Meanwhile, the image processing unit 160 may execute image processing such as a resolution conversion process, various color tone correction processes of adjustment of luminance or chroma, or a keystone correction process, as necessary, with respect to image data.

The voice processing unit 170 acquires a voice signal included in the content, amplifies the acquired voice signal, and supplies the amplified voice signal to a speaker (not shown) within the right earphone 32 and a speaker (not shown) within the left earphone 34 which are connected to the connection member 46. Meanwhile, when a Dolby (Registered Trademark) system, for example, is adopted, a process is performed on the voice signal, and each of the right earphone 32 and the left earphone 34 outputs, for example, a different sound having a frequency or the like changed. In addition, the voice processing unit 170 transmits a voice acquired by the microphone 63, as a control signal, to the display image setting unit 165.

The object recognition unit 168 detects a first target image which is a specific target image associated with a plurality of AR scenarios stored in the scenario DB 138, from a captured image of the camera 61, by pattern matching or a statistical identification method. In the present embodiment, after a category into which the plurality of AR scenarios stored in the scenario DB 138 are classified is selected, the object recognition unit 168 detects the first target image associated with an AR scenario which is included in the selected category. Hereinafter, the detection of the specific target image from the captured image is also simply referred to as the detection of the specific target. Meanwhile, the object recognition unit 168 also detects a second target, a third target or the like which is a specific target different from the first target, from the captured image, depending on the situation of the AR scenario which is executed, or the like. When the first target is detected from the captured image, the object recognition unit 168 transmits information of the detected first target and an AR scenario associated with the detected first target, to the display image setting unit 165. Meanwhile, the camera 61 and the object recognition unit 168 are equivalent to a detection unit in the aspect of the invention. In addition, the AR scenario associated with the first target is equivalent to a first moving image in the aspect of the invention. In other embodiments, the object recognition unit 168 may detect the first target associated with an AR scenario received from another device by the radio communication unit 132, from the captured image, and may detect the first target associated with an AR scenario which is stored in a USB memory or the like connected to the interface 180. Meanwhile, the radio communication unit 132 is equivalent to a receiving unit in the aspect of the invention. In addition, another device communicating through the radio communication unit 132 is equivalent to a storage device in the aspect of the invention.

In addition, when HMD 100 executes some kind of AR scenario, the object recognition unit 168 can also detect the second target which is a specific target different from the first target, from the captured image of the camera 61. The second target is associated with an AR scenario different from the AR scenario associated with the first target. When the second target is detected from the captured image, the object recognition unit 168 transmits information of the detected second target and the AR scenario associated with the second target, to the display image setting unit 165.

The CPU 140 executes an AR scenario associated with the specific target detected from the captured image, on the basis of the information which is transmitted from the object recognition unit 168. When the AR scenario is executed, the display image setting unit 165 causes the optical image display units 26 and 28 to display an image or the like included in the AR scenario to be executed. The display image setting unit 165 causes the image display unit 20 to display at least one AR image included in the AR scenario in association with the position or direction of the specific target detected from the captured image. Priority is set in the AR scenario with respect to the detected specific target, and the display image setting unit 165 causes the optical image display units 26 and 28 to preferentially display an image associated with a specific target having high priority which is set within the detected specific target.

When the object recognition unit 168 detects the second target during the execution of some kind of AR scenario, the CPU 140 executes another AR scenario associated with the second target different from the AR scenario to be executed. When the second target is detected from the captured image, the display image setting unit 165 causes the optical image display units 26 and 28 to display an image included in another AR scenario instead of the image included in the executed AR scenario. Meanwhile, the AR scenario associated with the second target is equivalent to a second moving image in the aspect of the invention.

The voice processing unit 170 outputs a voice based on a voice signal included in another AR scenario through the earphones 32 and 34. In addition, the voice processing unit 170 outputs a voice based on the voice signal included in the AR scenario through the earphones 32 and 34. The voice processing unit 170 performs various types of processes on the basis of the voice which is acquired from the microphone 63. For example, when choices are included in the AR scenario, the voice processing unit 170 selects one choice from the choices on the basis of the acquired voice.

The interface 180 is an interface for connecting various external devices OA serving as supply sources of content to the control unit 10. Examples of the external device OA include a storage device having AR scenarios stored therein, a personal computer (PC), a cellular phone terminal, a game terminal, and the like. Examples of the interface 180 to be used include a USB interface, a micro USB interface, a memory card interface, and the like.

The image display unit 20 includes the right display drive unit 22, the left display drive unit 24, the right light guide plate 261 as the right optical image display unit 26, the left light guide plate 262 as the left optical image display unit 28, the camera 61, and the microphone 63.

The right display drive unit 22 includes the receiving unit 53 (Rx 53), the right backlight control unit 201 (right BL control unit 201) and the right backlight 221 (right BL 221) which function as light sources, the right LCD control unit 211 and the right LCD 241 which function as display elements, and the right projection optical system 251. The right backlight control unit 201 and the right backlight 221 function as light sources. The right LCD control unit 211 and the right LCD 241 function as display elements. Meanwhile, the right backlight control unit 201, the right LCD control unit 211, the right backlight 221, and the right LCD 241 are also called an "image light generation unit" collectively.

The receiving unit 53 functions as a receiver for serial transmission between the control unit 10 and the image display unit 20. The right backlight control unit 201 drives the right backlight 221 on the basis of the control signal which is input. The right backlight 221 is, for example, an illuminant such as an LED or electroluminescence (EL). The right LCD control unit 211 drives the right LCD 241 on the basis of the control signal which is transmitted from the image processing unit 160 and the display control unit 190. The right LCD 241 is a transmission type liquid crystal panel having a plurality of pixels arranged in a matrix.

The right projection optical system 251 is constituted by a collimating lens in which image light emitted from the right LCD 241 is changed to be a flux of light in a parallel state. The right light guide plate 261 as the right optical image display unit 26 guides the image light which is output from the right projection optical system 251, to a user's right eye RE while reflecting the light along a predetermined light path. Meanwhile, the right projection optical system 251 and the right light guide plate 261 are also called a "light guiding portion" collectively.

The left display drive unit 24 has the same configuration as that of the right display drive unit 22. The left display drive unit 24 includes the receiving unit 54 (Rx 54), the left backlight control unit 202 (left BL control unit 202) and the left backlight 222 (left BL 222) which function as light sources, the left LCD control unit 212 and the left LCD 242 which function as display elements, and the left projection optical system 252. The left backlight control unit 202 and the left backlight 222 function as light sources. The left LCD control unit 212 and the left LCD 242 function as display elements. Meanwhile, the left backlight control unit 202, the left LCD control unit 212, the left backlight 222, and the left LCD 242 are also called an "image light generation unit" collectively. In addition, the left projection optical system 252 is constituted by a collimating lens in which image light emitted from the left LCD 242 is changed to a flux of light in a parallel state. The left light guide plate 262 as the left optical image display unit 28 guides the image light which is output from the left projection optical system 252, to a user's left eye LE while reflecting the light along a predetermined light path. Meanwhile, the left projection optical system 252 and the left light guide plate 262 are also called a "light guiding portion" collectively.

Figure 3:
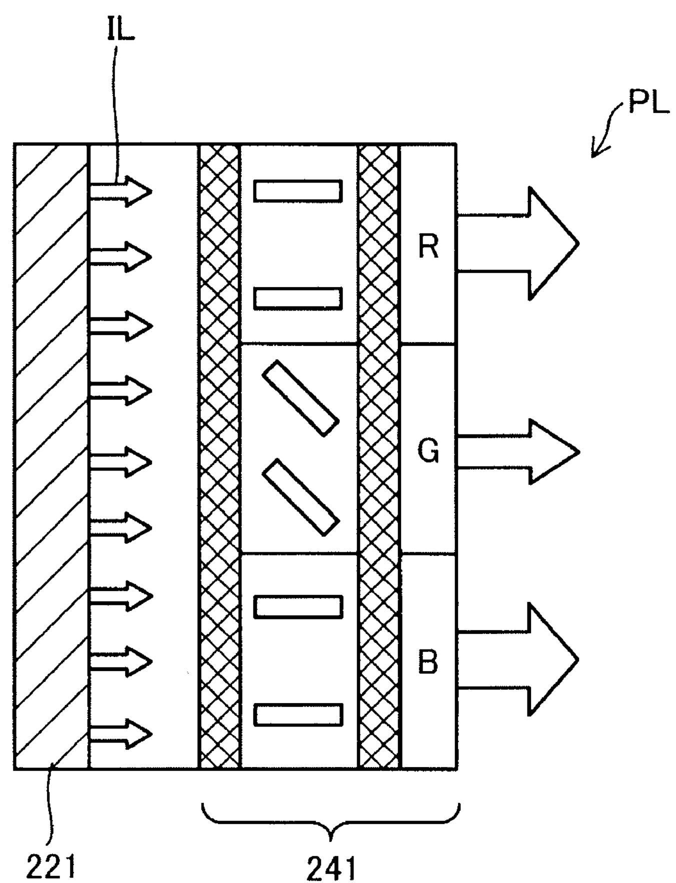
FIG. 3 is a diagram illustrating a state where image light is emitted by an image light generation unit.

FIG. 3 is a diagram illustrating a state in which image light is emitted by the image light generation unit. The right LCD 241 changes the transmittance of light passing through the right LCD 241 by driving liquid crystal at each pixel position which are arranged in a matrix, and thus illumination light IL irradiated from the right backlight 221 is modulated into effective image light PL indicating an image. The same is true of the left LCD. Meanwhile, as shown in FIG. 3, in the present embodiment, a backlight mode is adopted, but a configuration in which the image light is emitted using a reflection mode or a front light mode may be used.

A-2. AR Scenario Execution Process

Figure 4:
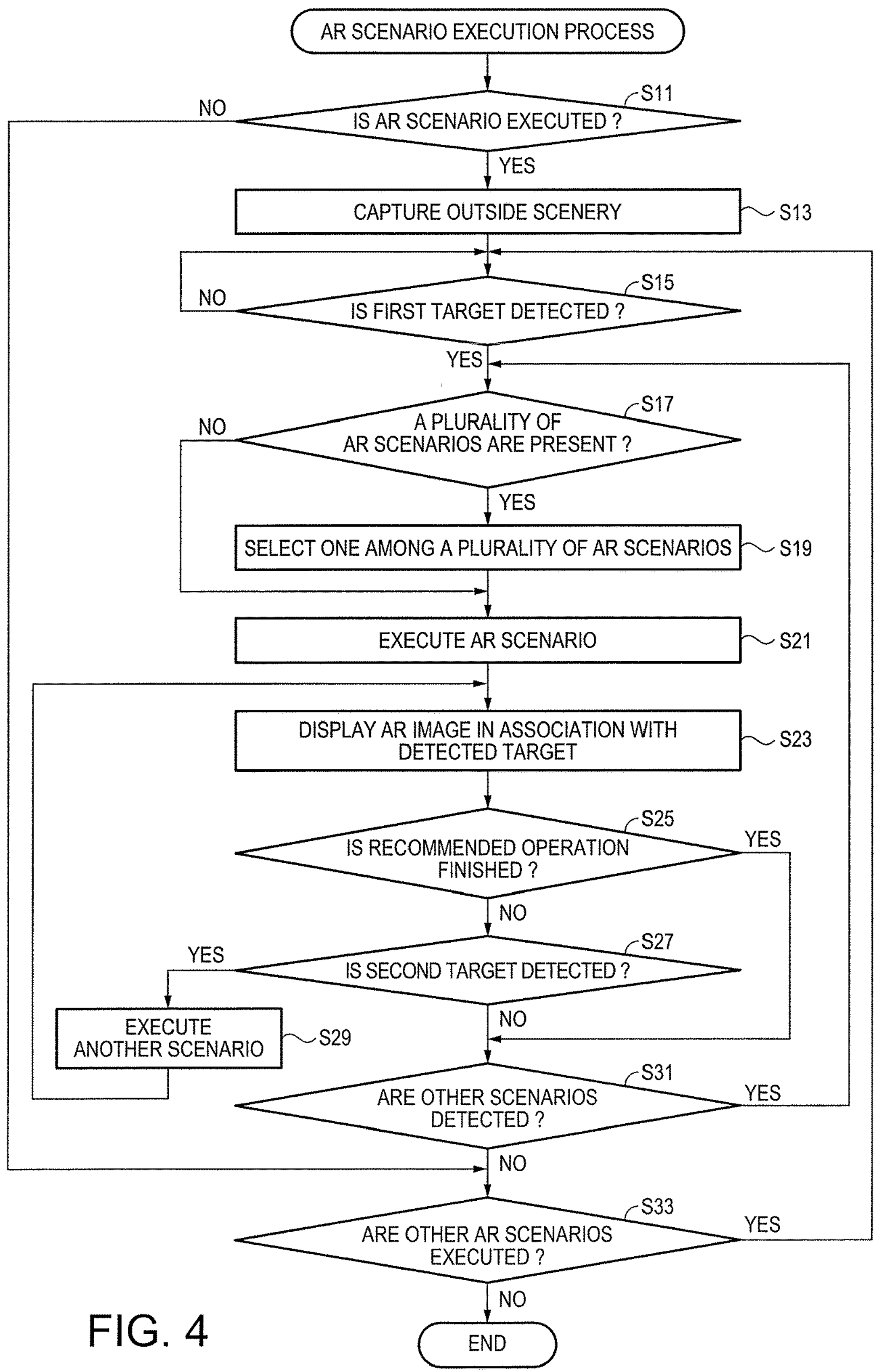
FIG. 4 is a flow diagram of an AR scenario execution process.

FIG. 4 is a flow diagram of an AR scenario execution process. The AR scenario execution process is a process of executing an AR scenario according to a target which is detected from a captured image by the CPU 140. In the AR scenario execution process, initially, the CPU 140 determines whether the operating unit 135 accepts a predetermined operation for executing an AR scenario (step S11). In the present embodiment, the CPU 140 causes the optical image display units 26 and 28 to display an image for causing a user to select a category of AR scenarios stored and classified into the scenario DB 138. The CPU 140 determines whether the category of AR scenarios displayed on the optical image display units 26 and 28 is selected as a predetermined operation for executing the AR scenario. When it is determined that the predetermined operation is not accepted (step S11: NO), the CPU 140 terminates the AR scenario execution process. Meanwhile, in the present embodiment, as the category of AR scenarios, a case where "cooking" is selected will be described.

In a process of step S11, when it is determined that the predetermined operation for executing the AR scenario is accepted (step S11: YES), the CPU 140 captures an image of outside scenery through the camera 61 (step S13). Next, the object recognition unit 168 detects an image of a first target (hereinafter, also simply referred to as a "first target") as a specific target associated with the AR scenario stored in the scenario DB 138, from the captured image of the outside scenery captured by the camera 61 (step S15). When the first target is not detected from the captured image (step S15: NO), the object recognition unit 168 continuously waits for the detection of the first target from the captured image (step S15). When the first target is detected from the captured image (step S15: YES), the CPU 140 determines whether a plurality of AR scenarios associated with the first target are present (step S17). When it is determined that the plurality of AR scenarios associated with the first target are present (step S17: YES), the display image setting unit 165 causes the optical image display units 26 and 28 to display a selection image for selecting one AR scenario from the plurality of AR scenarios, and causes a user to select one AR scenario (step S19). When it is determined that one AR scenario to be executed is selected by a user (step S19), the CPU 140 executes the selected AR scenario (step S21). In addition, when it is determined that the plurality of AR scenarios are not present (step S17: NO) in the process of step S17, the CPU 140 executes one AR scenario automatically (step S21). Meanwhile, hereinafter, the one AR scenario to be executed is also called a first scenario.

Figure 5:
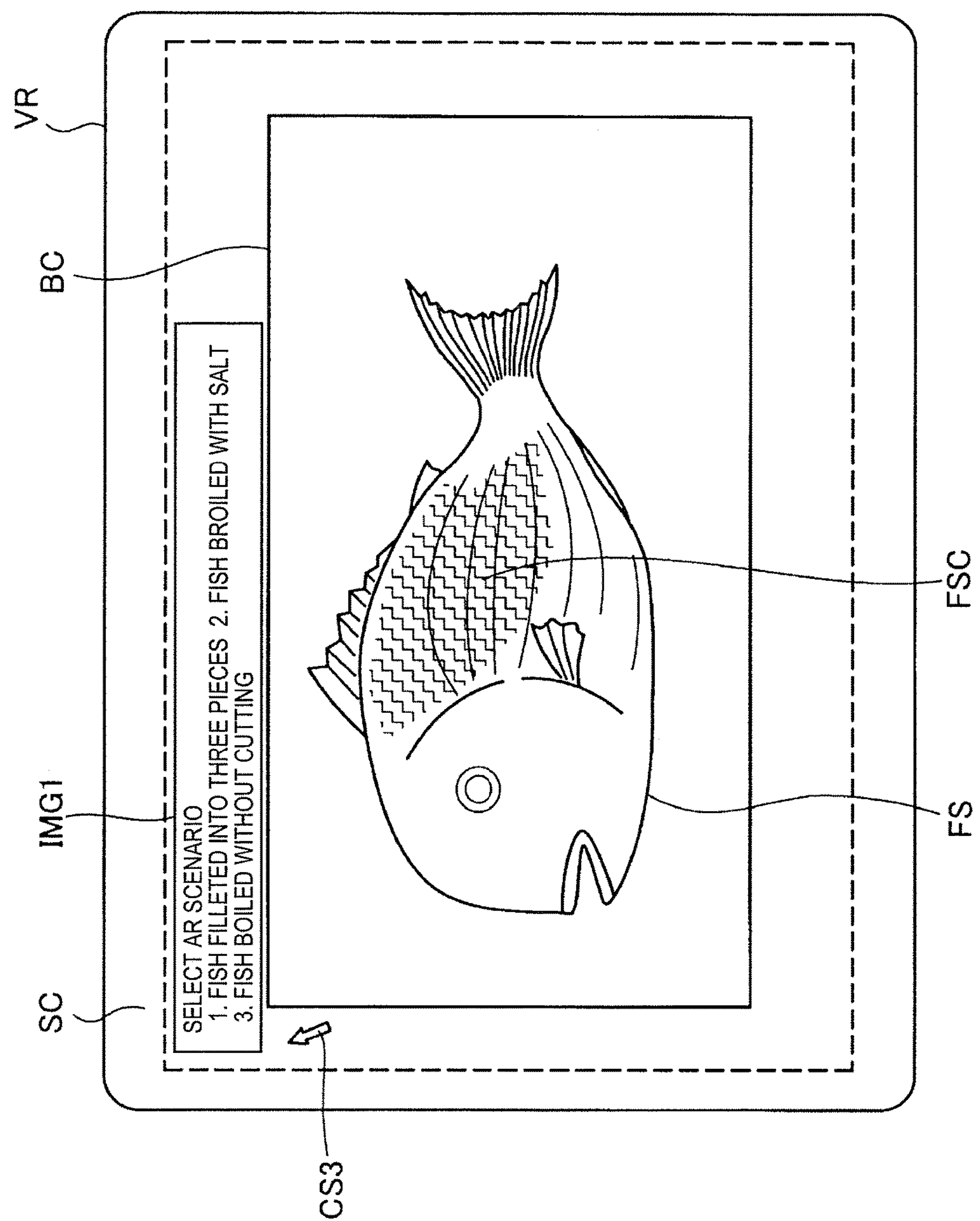
FIG. 5 is a diagram illustrating a field of view which is visually recognized by a user when a first scenario to be executed is selected from a plurality of AR scenarios.

FIG. 5 is a diagram illustrating a field of view VR which is visually recognized by a user when a first scenario to be executed is selected from a plurality of AR scenarios. FIG. 5 shows outside scenery SC that passes through the optical image display units 26 and 28 and is visually recognized by a user, and a selection image IMG1 and an arrow image CS3 which are displayed on the optical image display units 26 and 28. In the optical image display units 26 and 28, the selection image IMG1 and the arrow image CS3 are displayed within an image display maximum region PN which is a maximum region capable of displaying an image. The outside scenery SC includes a chopping board BC and a fish FS which is placed on the chopping board BC. A plurality of scales FSC stick to the surface of a body from the head of the fish FS to its tail. Meanwhile, in the present embodiment, the kind of fish FS is a sea bream. The display image setting unit 165 causes candidates of a plurality of AR scenarios associated with the fish FS to be displayed in the image display maximum region PN as the selection image IMG1, on the basis of the detected fish FS and the selected category of the AR scenarios of "cooking". As shown in the selection image IMG1 of FIG. 5, the candidates of the AR scenarios associated with the fish FS are "1. fish filleted into three pieces", "2. fish broiled with salt", and "3. fish boiled without cutting". The display image setting unit 165 displays the selection image IMG1 at a fixed position in the image display maximum region PN, regardless of the position of the detected fish FS. The operating unit 135 accepts a user's operation, and thus the arrow image CS3 moves within the image display maximum region PN. When the operating unit 135 accepts a determination operation in a state where the arrow image CS3 overlaps with any of the choices of the selection image IMG1, the CPU 140 selects one AR scenario to be executed. Meanwhile, in other embodiments, the microphone 63 accepts a voice input, and thus any of the choices of the selection image IMG1 may be selected. In the present embodiment, as the first scenario, a case where "1. fish filleted into three pieces" is selected will be described. Meanwhile, in FIG. 5 and the subsequent drawings, the image display maximum region PN is shown for convenience, but the outer frame of the image display maximum region PN indicated by a broken line is not visually recognized by a user.

When an AR scenario is executed, the display image setting unit 165 causes an AR image included in the AR scenario to be displayed in the image display maximum region PN in association with the position or direction of the first target specified by the object recognition unit 168 (step S23). The object recognition unit 168 performs pattern matching on the fish FS from the captured image, and thus specifies a region occupied by the fish FS in the captured image and the position coordinate. The object recognition unit 168 specifies the position of the head of the fish FS and the position of its tail on the basis of the specified region and the position coordinate, and thus specifies the direction of the fish FS in the captured image. The display image setting unit 165 displays an image within the image display maximum region PN in association with one coordinate which is previously set in the fish FS in the specified captured image. Meanwhile, the AR scenario of the present embodiment is mainly a moving image for supporting a user's operation of the HMD 100. For this reason, the moving image included in the AR scenario which is stored in the scenario DB 138 is often a recommended operation for encouraging a user. When it is determined that the same operation as the moving image displayed on the image display unit 20 by the display image setting unit 165 is performed by a user on the basis of the captured image, the CPU 140 terminates the first scenario which is executed, or executes another AR scenario.

Figure 6:
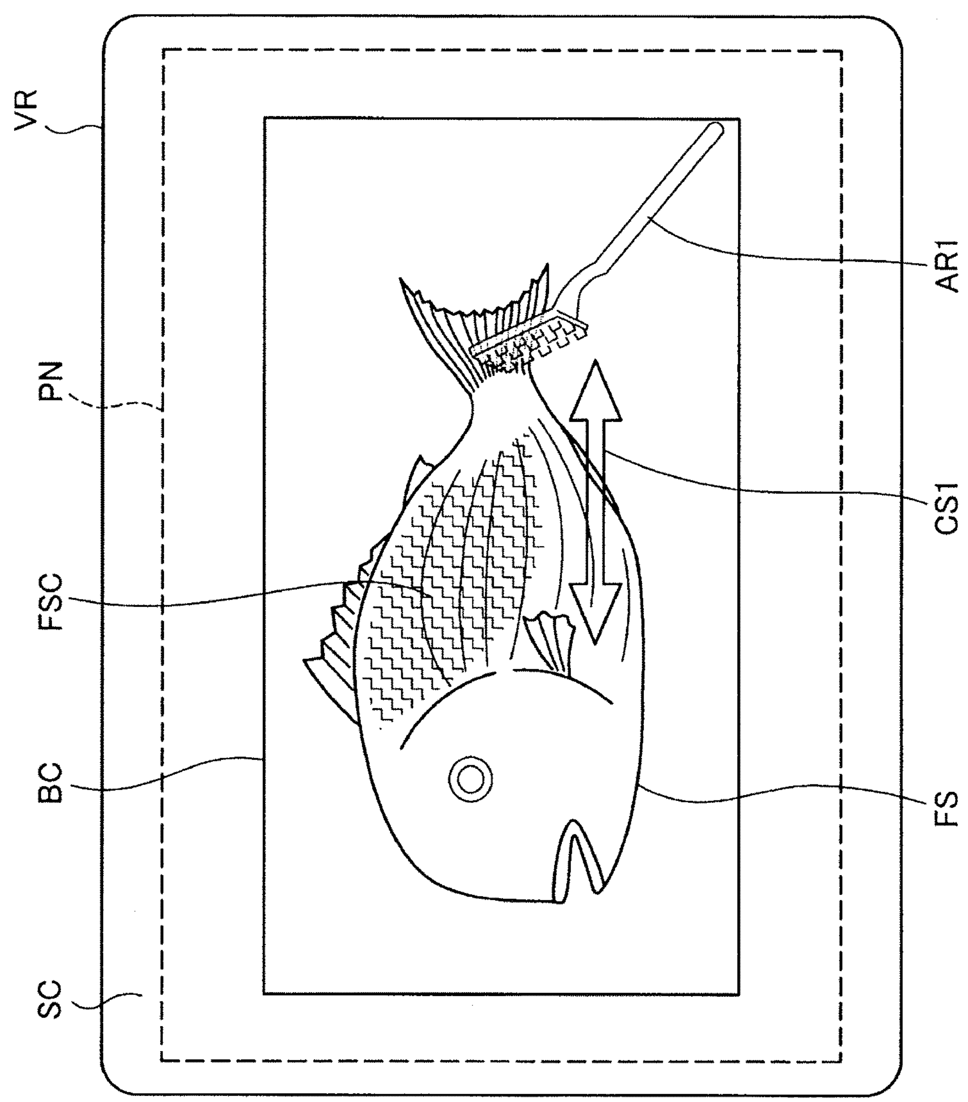
FIG. 6 is a diagram illustrating a field of view which is visually recognized by a user when an AR image included in the AR scenario is displayed on an optical image display unit.

FIG. 6 is a diagram illustrating a field of view VR which is visually recognized by a user when an AR image included in an AR scenario is displayed in the image display maximum region PN. FIG. 6 shows a field of view VR when an image AR1 which is an AR image of a "scale remover" associated with the fish FS as the first target is displayed in a case where the category of an AR scenario of "cooking" is selected from the scenario DB 138. As shown in FIG. 6, since the image AR1 is displayed in the image display maximum region PN, a user visually recognizes the outside scenery SC including the chopping board BC and the fish FS which passes through the optical image display units 26 and 28, and simultaneously visually recognizes the image AR1 which is displayed in the image display maximum region PN. The display image setting unit 165 causes a moving image in which the image AR1 moves back and forth between the head and tail of the fish FS specified by the object recognition unit 168 to be displayed within the image display maximum region PN. The image AR1 is a moving image for supporting a user's operation of removing the scales of the fish FS with the scale remover. An arrow image CS1 shown in FIG. 6 shows an image in which the scale remover moves back and forth between the head and tail of the image AR1, and the arrow image CS1 is not displayed within the image display maximum region PN. Meanwhile, in the present embodiment, the angle of view of the camera 61 and the field of view VR which is visually recognized by a user are set so as to be the same as each other.

In step S23 of FIG. 4, when the image AR1 is displayed in the image display maximum region PN in association with the position or direction of the fish FS, the object recognition unit 168 determines whether a user has performed an operation which is recommended in the AR scenario of the "scale remover", including the image AR1, which is executed (step S25). The object recognition unit 168 performs the determination of whether a user has performed the operation of the "scale remover", on the basis of the detection of the real scale remover and the movement of the real scale remover from the captured image. In a specific determination method, the real scale remover equivalent to the image AR1 is detected from the captured image, and a determination is performed by detecting whether the detected real scale remover moves back and forth between the head of the fish FS and its tail the preset number of times.

In the process of step S25, when the object recognition unit 168 determines that a user does not perform the operation which is recommended in the first scenario which is executed (step S25: NO), the object recognition unit 168 detects an image of a second target (hereinafter, also simply called a "second target") associated with a second scenario which is an AR scenario different from the first scenario, from the captured image (step S27). When the second target is detected from the captured image (step S27: YES), the CPU 140 executes the second scenario associated with the second target (step S29). When the second scenario is executed, the display image setting unit 165 causes the AR image included in the second scenario to be displayed within the image display maximum region PN in association with the position or direction of the detected second target (step S23).

Figure 7:
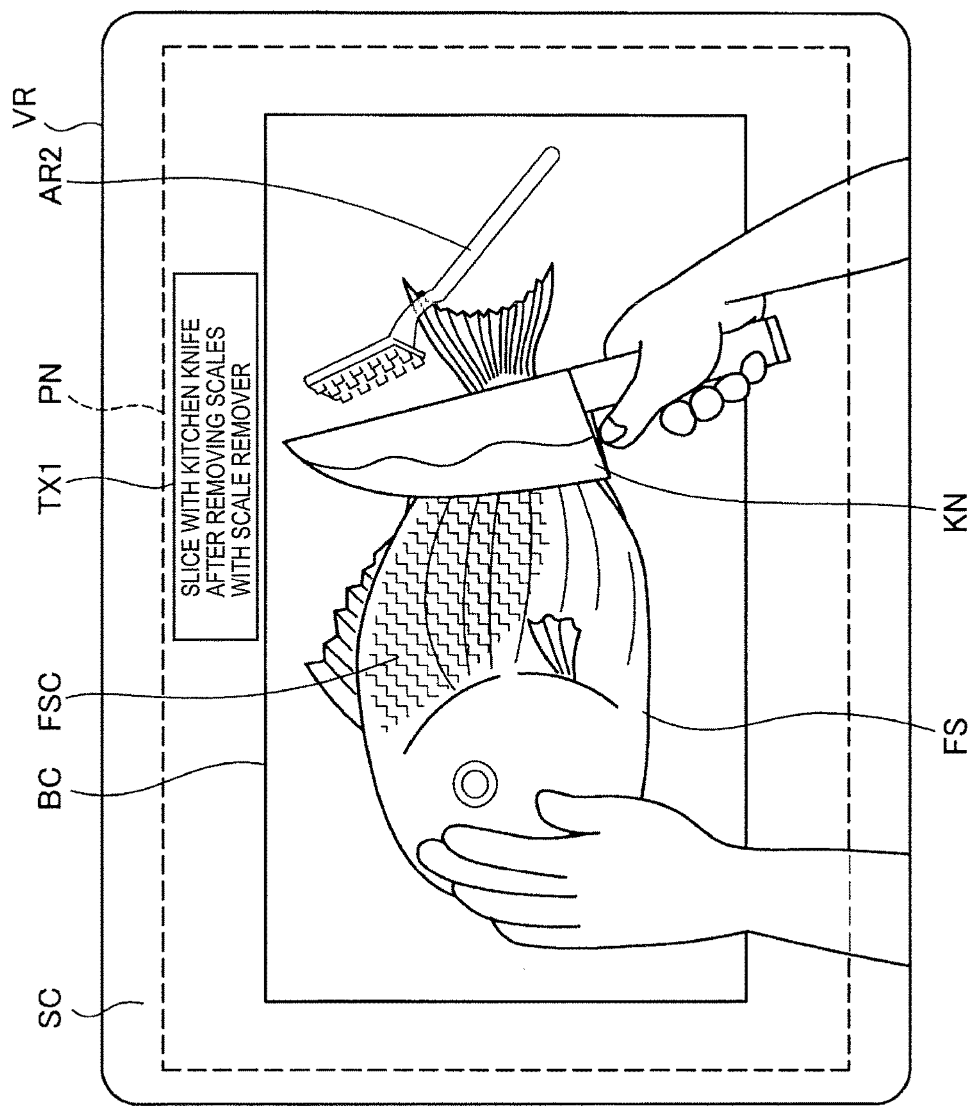
FIG. 7 is a diagram illustrating a field of view which is visually recognized by a user when a second target is detected from a captured image and a second scenario is executed.

FIG. 7 is a diagram illustrating a field of view VR which is visually recognized by a user when the second target is detected from the captured image and the second scenario is executed. FIG. 7 shows a user's field of view VR when a kitchen knife KN as the second target is detected from the captured image in a state where the recommended operation of the "scale remover" which is encouraged in the AR scenario is not terminated. The field of view VR includes a text image TX1 and an image AR2 of the scale remover which is an AR image included in the second scenario, in addition to the outside scenery SC passing through the optical image display units 26 and 28. The display image setting unit 165 causes the text image TX1 indicated by characters for encouraging an operation of removing the scales of the fish FS with the scale remover and the image AR2 of the scale remover, rather than the kitchen knife KN, to be displayed in the image display maximum region PN, as the AR image included in the second scenario. The display image setting unit 165 causes the display positions of the text image TX1 and the image AR2 in the image display maximum region PN to be displayed in association with the position or direction of the kitchen knife KN which is the detected second target. For this reason, the image AR1 of the scale remover which is displayed in association with the position of the fish FS in the first scenario and the image AR2 of the scale remover which is displayed in association with the position of the kitchen knife KN in the second scenario are displayed at different positions in the image display maximum region PN. Meanwhile, the voice processing unit 170 may output the same voice as the characters of the text image TX1 through the earphones 32 and 34, in accordance with the display of the text image TX1 by the display image setting unit 165.

In the process of step S23 of FIG. 4, when the text image TX1 and the image AR2 are displayed in the image display maximum region PN in association with the position of the kitchen knife KN, the object recognition unit 168 determines whether an operation which is recommended to a user in the second scenario is performed (step S25). When it is detected that a user has the scale remover shown by the image AR2 rather than the kitchen knife KN in accordance with the text image TX1 of FIG. 7, the object recognition unit 168 determines that the recommended operation of the second scenario is performed. When it is determined that the recommended operation is performed (step S25: YES), the object recognition unit 168 determines whether an image of a specific target associated with the AR scenario of the category selected from the captured image is detected (step S31). Since the fish FS as the first target is detected in the captured image (step S31: YES), the object recognition unit 168 performs processes of steps S17 and S19, and then executes the first scenario associated with the first target (step S21). The display image setting unit 165 causes the image AR1 of the scale remover included in the first scenario to be displayed in the image display maximum region PN in association with the position of the fish FS (step S25), and the object recognition unit 168 determines whether the scaling of the fish FS which is a recommended operation of the first scenario is terminated (step S25). When the detected scale remover moves back and forth between the head of the fish FS and its tail equal to or more than a predetermined number of times (for example, 20 times), the object recognition unit 168 determines that the scaling which is the recommended operation of the first scenario is performed by a user. Meanwhile, the determination of whether the recommended operation of the scaling is performed can be modified in various ways. For example, the determination thereof may be performed by recognizing an image of the scales on the surface of the fish FS.

When it is determined that the scaling of the fish FS which is a recommended operation is terminated (step S25: YES), the object recognition unit 168 detects a specific target associated with other AR scenarios from the captured image (step S31). When other targets are not detected from the captured image (step S31: NO), the CPU 140 determines whether other scenarios are executed (step S33). The CPU 140 accepts the execution or the like of AR scenarios (for example, AR scenarios acquired through the radio communication unit 132) other than the AR scenario which is stored in the scenario DB 138, through an operation accepted by the operating unit 135, a voice acquired by the microphone 63, or the like.

In the process of step S33, when it is determined that the CPU 140 receives other AR scenarios through the radio communication unit 132 and executes the received AR scenario by the operation accepted by the operating unit 135 (step S33: YES), the object recognition unit 168 detects a third target which is a specific target associated with the AR scenario to be executed, from the captured image (step S15). Meanwhile, the third target as used herein is the same as the first target. When the third target is detected (step S15: YES), the CPU 140 performs the processes of step S17 and the subsequent steps. Meanwhile, the third target is equivalent to the first target in the aspect of the invention.

In the present embodiment, the fish FS of which the scaling is terminated is detected as the third target, and an AR scenario associated with the third target in which filleting of the fish FS in three pieces is set to a recommended operation to a user is executed. Meanwhile, hereinafter, the AR scenario associated with the third target is also simply called a third scenario.

Figure 8:
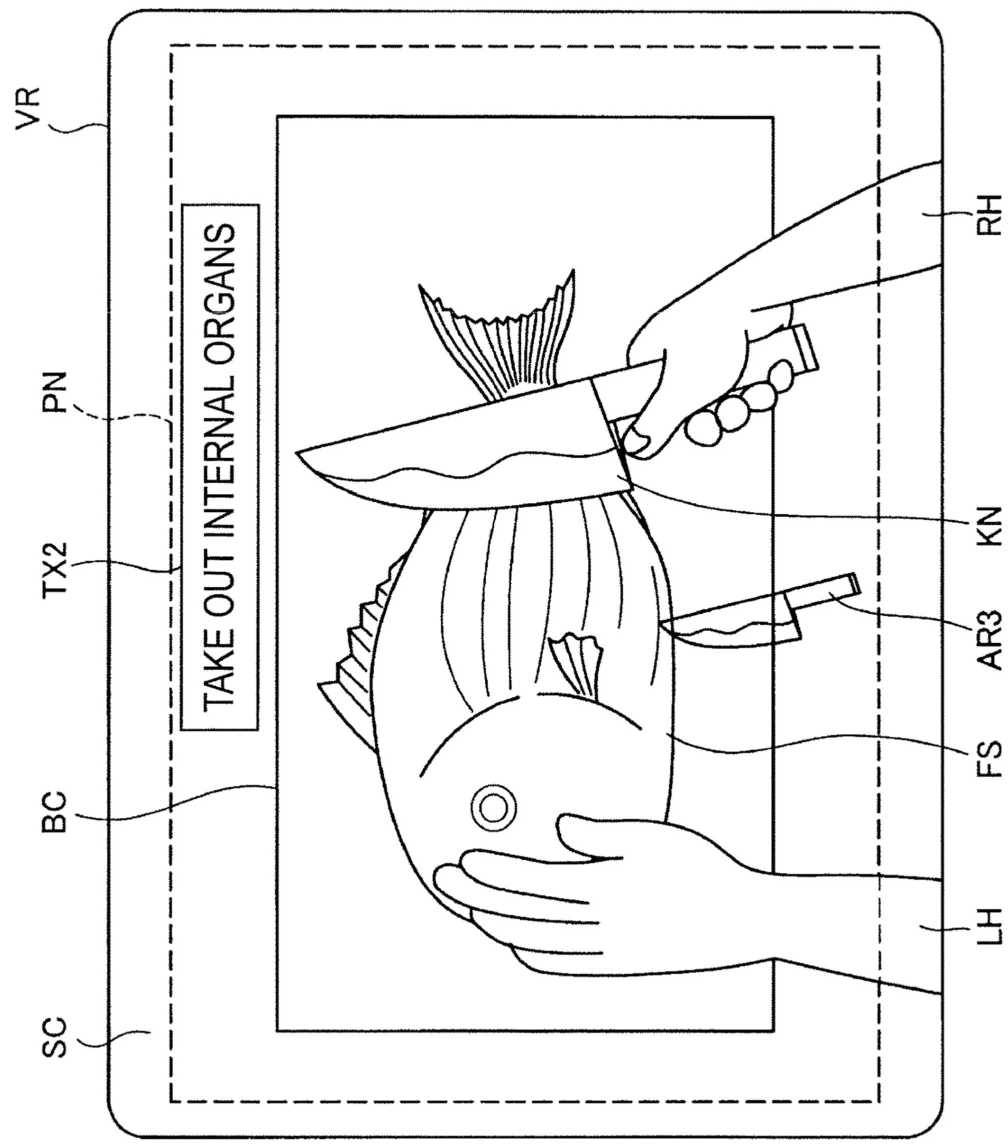
FIG. 8 is a diagram illustrating a field of view which is visually recognized by a user when a third target is detected from the captured image and a third scenario is executed.

FIG. 8 is a diagram illustrating a field of view VR which is visually recognized by a user when the third target is detected from the captured image and the third scenario is executed. FIG. 8 shows the outside scenery SC including the fish FS of which the scaling is terminated as the third target. In addition, as shown in FIG. 8, a user's right hand RH holds the kitchen knife KN, and a user's left hand LH presses down the head of the fish FS. When the object recognition unit 168 detects the third target, the display image setting unit 165 causes an image AR3 which is an AR image of the kitchen knife included in the third scenario to be executed and a text image TX2 indicating a recommended operation to be displayed in the image display maximum region PN. The image AR3 and the text image TX2 are displayed in the image display maximum region PN in association with the fish FS as the third target. For this reason, a position at which the text image TX2 is displayed is different from the position of the text image TX1 associated with the kitchen knife KN in FIG. 7. The text image TX2 is a character image for encouraging a user to initially take out the internal organs of the fish FS in the third scenario in which a recommended operation of filleting of the fish FS in three pieces is encouraged. The display image setting unit 165 displays an image included in the third scenario to be executed, in the image display maximum region PN, on the basis of the third target detected by the object recognition unit 168 or other targets. Similarly, the voice processing unit 170 outputs a voice included in the third scenario to be executed, through the earphones 32 and 34.

Figure 9:
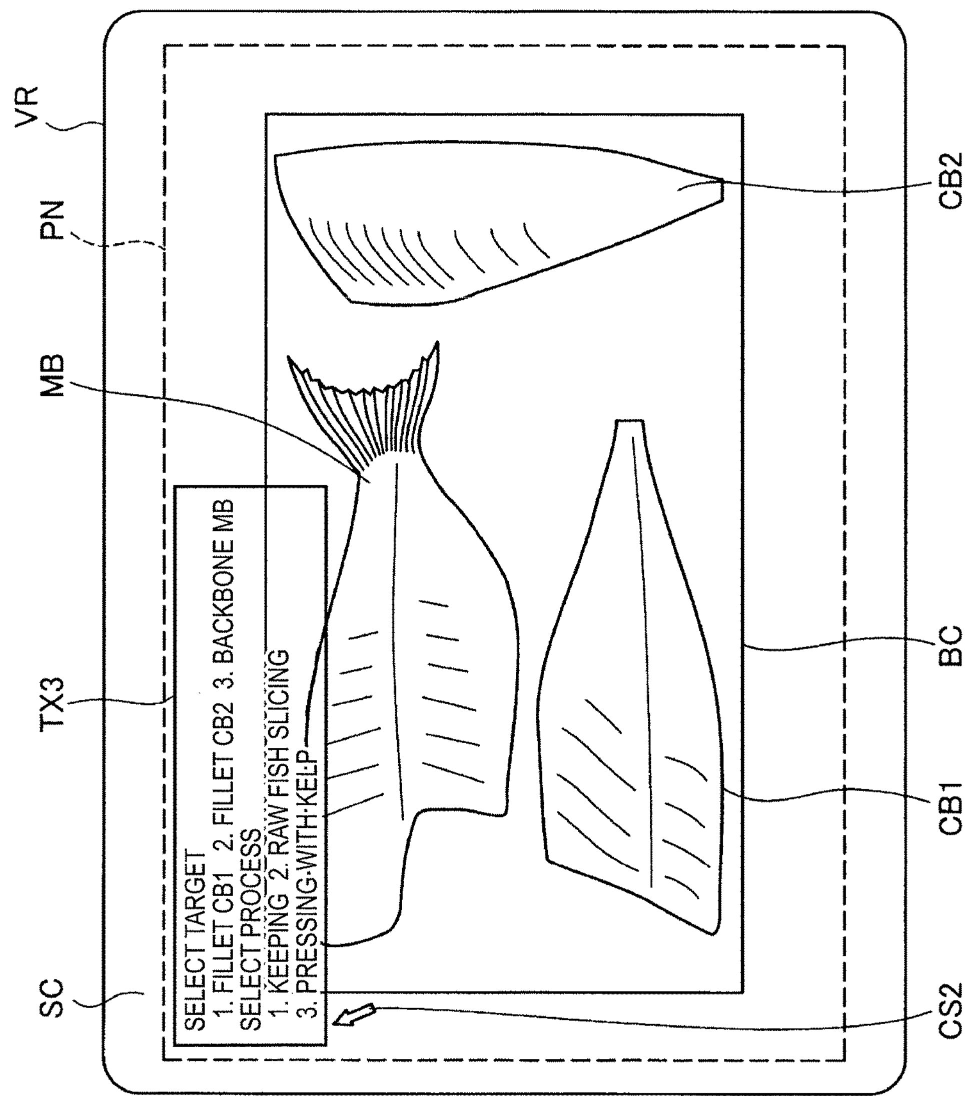
FIG. 9 is a diagram illustrating a field of view which is visually recognized by a user when a fourth scenario which is executed after the third scenario is terminated is executed.

FIG. 9 is a diagram illustrating a field of view VR which is visually recognized by a user when a fourth scenario which is executed after the third scenario is terminated is executed. FIG. 9 shows a field of view VR which is visually recognized by a user in which, after the recommended operation of the third scenario where the fish FS is filleted into three pieces is completed by a user, each piece of the fish FS filleted into three pieces is detected as a fourth target from the captured image, and the fourth scenario which is an AR scenario associated with the fourth target is executed. When the fourth scenario is executed, the object recognition unit 168 causes an arrow image CS2 of an AR image included in the fourth scenario and a text image TX3 for causing a user to select processing of the fish FS filleted into three pieces to be displayed in the image display maximum region PN. The text image TX3 and the arrow image CS2 are displayed in the image display maximum region PN when each of fillets CB1 and CB2 and a backbone MB of the fish FS filleted into three pieces is detected. The object recognition unit 168 causes positions at which the text image TX3 and the arrow image CS2 are displayed to be displayed at fixed positions in the image display maximum region PN, regardless of the positions or directions of the fillets CB1 and CB2 and the backbone MB. The text image TX3 is an image for causing a user to select keeping, raw fish slicing and pressing with kelp, as processing of the fillet CB1, the fillet CB2 and the backbone MB. When any of the choices (for example, 1. fillet CB1) of the text image TX3 is selected by the operating unit 135 accepting a user's operation, the CPU 140 outputs an image and a voice associated with the selected choice. In addition, any of the choices of the text image TX3 may be selected by the microphone 63 accepting a voice input.

Figure 10:
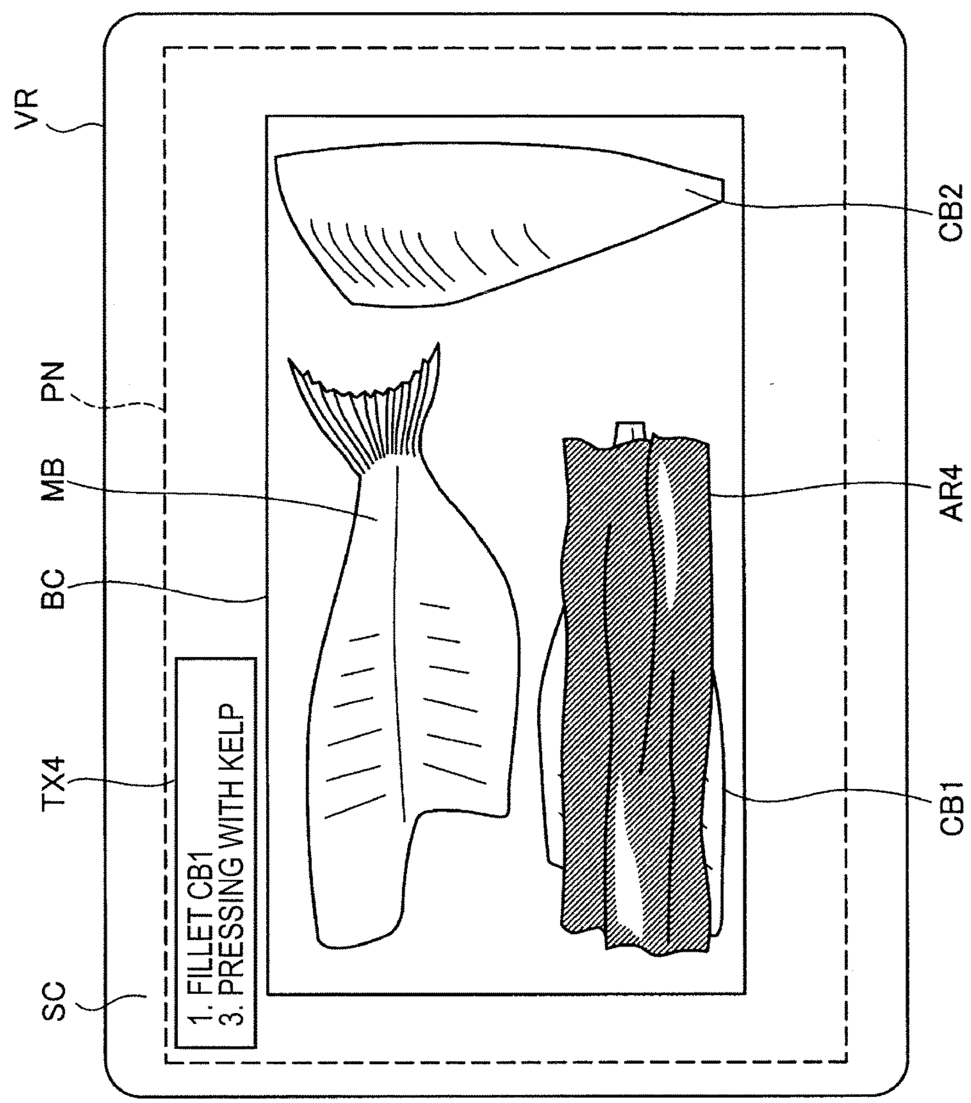
FIG. 10 is an image illustrating a field of view which is visually recognized by a user after a choice within a text image of FIG. 9 is selected.

FIG. 10 is an image illustrating a field of view VR which is visually recognized by a user after choices within the text image TX3 of FIG. 9 are selected. FIG. 10 shows an image AR4 and a text image TX4 which are AR images displayed in the image display maximum region PN when in the text image TX3 of FIG. 9, "1. fillet CB1" is selected as a target to be processed, and "3. pressing with kelp" is selected as processing of the fillet CB1. The display image setting unit 165 causes the text image TX4 indicating a specific process of the AR scenario which is executed to be displayed at a fixed position in the image display maximum region PN. In addition, the display image setting unit 165 causes an AR image of kelp used in pressing with kelp to be displayed in the image display maximum region PN, as the image AR4, in association with the position and direction of the fillet CB1 which is selected by a user and is detected from the captured image by the object recognition unit 168. Thereby, the HMD 100 can cause a user to recognize a process required for pressing with kelp of the fillet CB1 as a recommended operation.

In step S25 of FIG. 4, when the process of pressing with kelp of the fourth scenario is performed on the fillet CB1 as the recommended operation (step S25: YES), the object recognition unit 168 detects other targets from the captured image (step S31). When other targets are not detected (step S31: NO) and it is determined that other AR scenarios are not further executed (step S33: NO), the CPU 140 terminates the AR execution process.

As described above, in the HMD 100 of the first embodiment, the object recognition unit 168 detects the first target from the captured image of the camera 61, and the display image setting unit 165 causes the image AR1 of the scale remover to be displayed in the image display maximum region PN in association with the detected position of the fish FS when the first scenario which is a recommended operation of the scaling of the fish FS associated with the first target is executed. For this reason, in the HMD 100 of the first embodiment, one object is detected from a plurality of objects included in the outside scenery SC, and an image associated with the position of the detected object is displayed. Thereby, since a user can perform work or the like while visually recognizing an image which is displayed in accordance with the real position, it is possible to support work which is performed by a user, and to improve the efficiency of a user's work, or the like.

In addition, in the HMD 100 of the first embodiment, since the object recognition unit 168 can detect the fish FS which is the first target as an image, it is possible to improve the accuracy of detection of the fish FS.

In addition, in the HMD 100 of the first embodiment, since the image AR1 of the scale remover associated with the fish FS as the first target is a moving image relevant to the recommended operation of the scale remover which is performed on the fish FS, a user more easily recognizes the recommended operation, and thus it is possible to further improve the efficiency of a user's work, or the like.

In addition, in the HMD 100 of the first embodiment, when the object recognition unit 168 detects the kitchen knife KN as the second target from the captured image, the display image setting unit 165 causes the text image TX1 and the image AR2 of the scale remover which are included in the second scenario to be executed to be displayed in the image display maximum region PN. For this reason, in the HMD 100 of the first embodiment, even when priority is set in an object to be detected, and a plurality of specific targets associated with a plurality of AR scenarios are detected, an image which is displayed in the image display maximum region PN is changed on the basis of the priority which is set in the detected specific targets. Thereby, since an image having the most suitable situation can be visually recognized by a user, a user's usability is further improved.

In addition, in the HMD 100 of the first embodiment, the display image setting unit 165 can cause the text image TX4 and the image AR4 to be displayed in the image display maximum region PN in association with the process accepted with respect to the fillet CB1 of the fish FS filleted into three pieces, on the basis of the voice acquired by the microphone 63. Therefore, in the HMD 100 of the first embodiment, since a user can operate the image displayed in the image display maximum region PN depending on the voice, in addition to the detected specific target, and thus a user's usability is further improved.

In addition, in the HMD 100 of the first embodiment, when the first scenario is executed, and the kitchen knife KN as the second target is detected, the voice processing unit 170 outputs the same voice as the characters of the text image TX1 displayed in the image display maximum region PN. Therefore, in the HMD 100 of the first embodiment, since a user can recognize information depending on the voice in addition to the image displayed in the image display maximum region PN, and a user can recognize a great deal of information depending on the sense of sight and the sense of hearing, and thus a user's convenience is improved.

B. Second Embodiment

B-1. Configuration of HMD

FIG. 11 is a functional block diagram illustrating a configuration of an HMD 100*a* of a second embodiment. The HMD 100*a* of the second embodiment is different from the HMD 100 of the first embodiment, in that a biological information acquisition sensor 90 and a biological information processing unit 169 of a CPU 140*a* are included therein, and other configurations are the same as each other. The biological information acquisition sensor 90 is a sensor which is formed separately from the control unit 10 and the image display unit 20. The biological information acquisition sensor 90 acquires biological information of a user. In the present embodiment, the biological information acquisition sensor 90 is a watch type sensor, and measures the user's muscular strength at this point of time through distortion detection using a strain gauge in a state of being mounted on a user's wrist. The biological information acquisition sensor 90 transmits measurement data of the acquired user's muscular strength to the CPU 140*a* of a control unit 10*a*. The acquired biological information is processed. The biological information processing unit 169 executes various types of processes included in the AR scenario to be executed, on the basis of the measurement data of the acquired user's muscular strength.

B-2. AR Scenario Execution Process

In the second embodiment, an AR scenario in which the tire replacement of an automobile is set to a recommended operation (hereinafter, also simply called a "tire replacement scenario") will be described with respect to an AR scenario execution process. In the second embodiment, processes of step S21 and the subsequent steps which are different processes within the processes in the AR scenario execution process (FIG. 4) of the first embodiment will be described.

Figure 12:
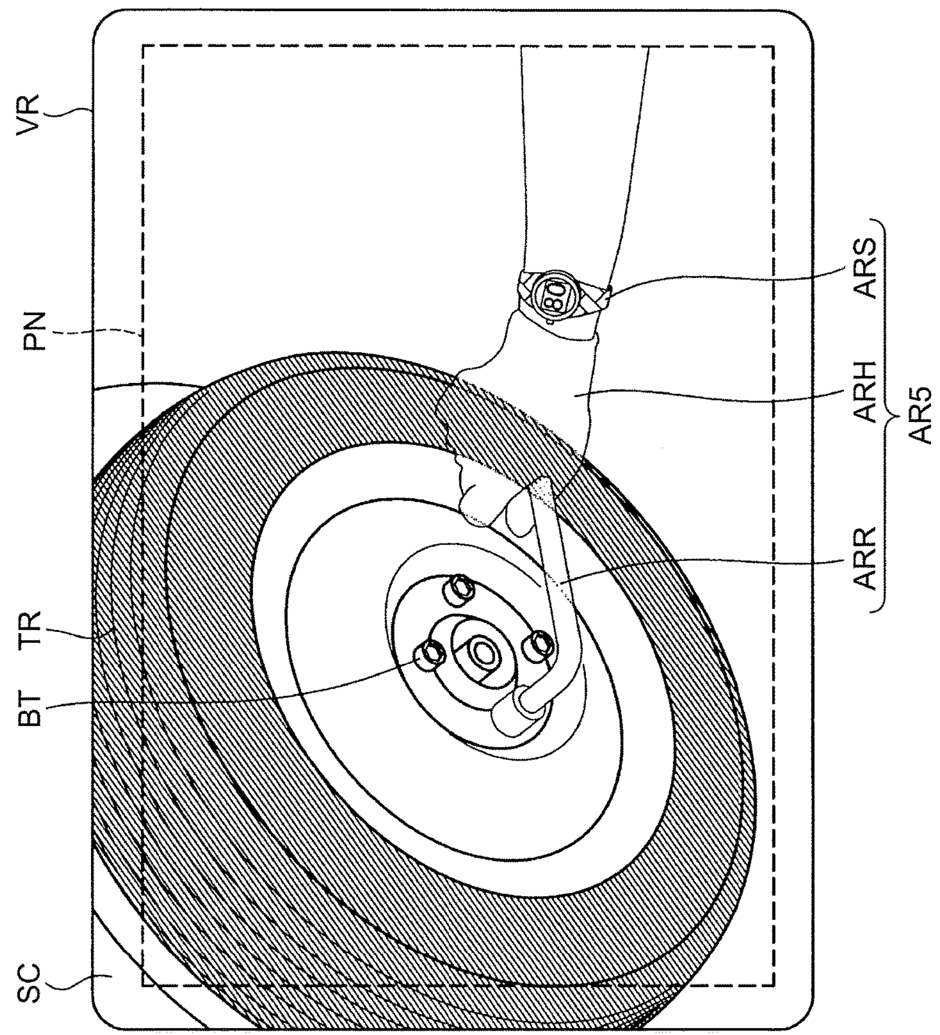
FIG. 12 is a diagram illustrating a field of view which is visually recognized by a user when a first target is detected and a tire replacement scenario is executed.

FIG. 12 is a diagram illustrating a field of view VR which is visually recognized by a user when a first target is detected and the tire replacement scenario is executed. FIG. 12 shows a field of view VR when the tire replacement scenario as an AR scenario is executed by the CPU 140*a* and the display image setting unit 165 causes an image AR5 which is an AR image to be displayed in the image display maximum region PN, in a case where an image of a tire TR as the first target is detected from a captured image. The tire TR included in the outside scenery SC is fixed to the main body of an automobile by four bolts BT. The image AR5 is constituted by a tool image ARR indicating a hexagonal wrench as a tool, an arm image ARH holding the tool image ARR, and a muscular strength sensor image ARS which is mounted on a wrist of the arm image ARH. That is, the image AR5 is an image in which the removal of the bolt BT of the tire TR by the hexagonal wrench using a user's arm on which the muscular strength sensor is mounted is set to a recommended operation. The display image setting unit 165 causes the tool image ARR within the image AR5 to be displayed in the image display maximum region PN in association with the detected position of the bolt BT of the tire TR. In addition, the display image setting unit 165 causes the arm image ARH and the muscular strength sensor image ARS within the image AR5 to be displayed in the image display maximum region PN in association with the tool image ARR. A numerical value of muscular strength recommended for rotating the tool is displayed on a display unit of the muscular strength sensor image ARS. The displayed numerical value (80) is a unit of percentage (%), and is a numerical value which is recommended after a relationship between the user's muscular strength and the strain gauge of the HMD 100 is set in advance.

When the tire replacement scenario is executed (step S23 of FIG. 4), and the image AR5 associated with the tire replacement scenario is displayed in the image display maximum region PN (step S23 of FIG. 4), the object recognition unit 168 determines whether the recommended operation of the tire replacement scenario is terminated (step S25).

Figure 13:
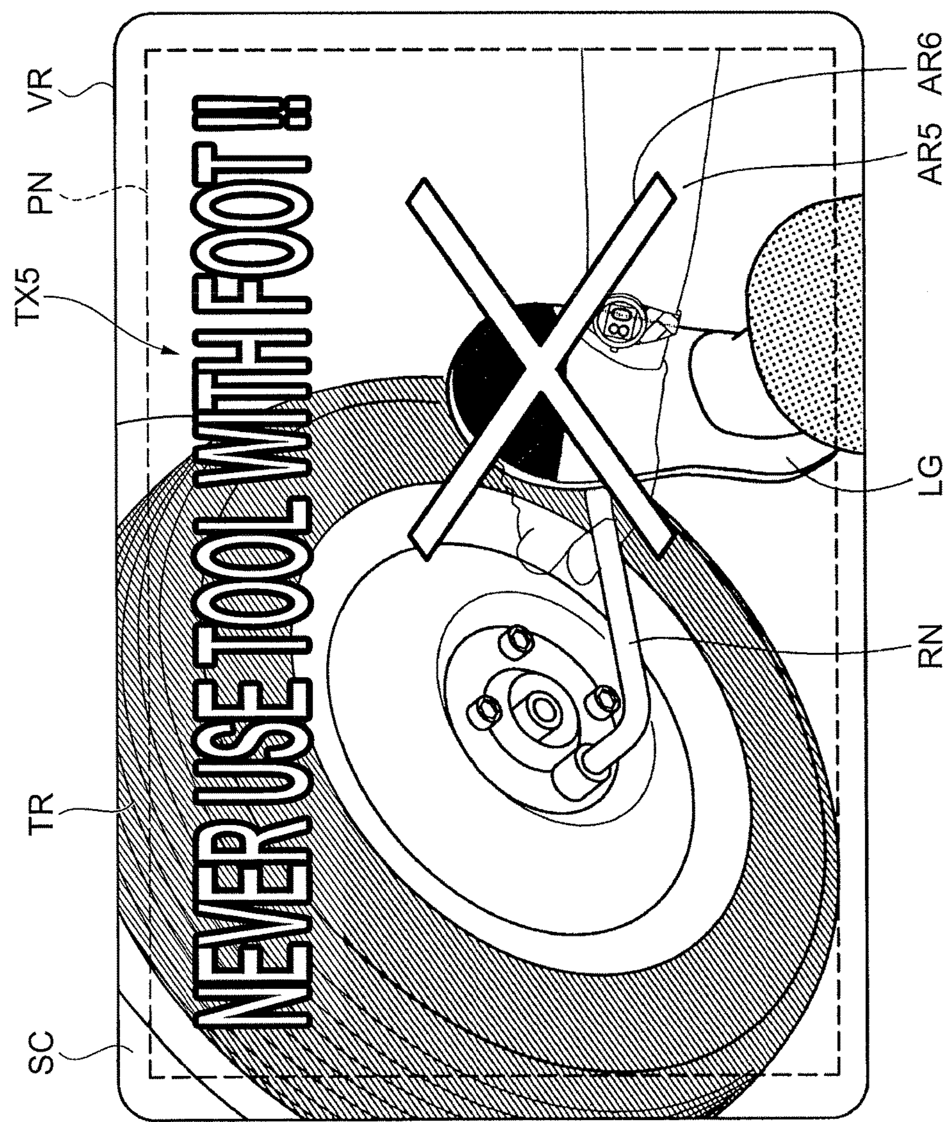
FIG. 13 is a diagram illustrating a field of view which is visually recognized by a user when a second target is detected during the execution of the tire replacement scenario.

FIG. 13 is a diagram illustrating a field of view VR which is visually recognized by a user when a second target is detected during the execution of the tire replacement scenario. FIG. 13 shows a text image TX5 and images AR5 and AR6 which are displayed in the image display maximum region PN when the second target is detected during the execution of the tire replacement scenario. The second target in the second embodiment is in a state where a tool RN which is a real hexagonal wrench and a leg LG are detected as a predetermined positional relationship. In FIG. 13, the tool image ARR within the image AR5 overlaps the real tool RN. When the object recognition unit 168 detects a positional relationship between the real tool RN and the leg LG of a user which is in contact therewith, the display image setting unit 165 causes the text image TX5 and the image AR6 to be displayed in the image display maximum region PN, in addition to the image AR5. The text image TX5 is a character image for urging a user to prohibit the user from rotating the tool RN using the leg LG. In addition, the image AR6 is an AR image indicating "x" for highlighting the contents of the text image TX5. The display image setting unit 165 causes the image AR6 to be displayed in the image display maximum region PN in association with a contact position detected between the tool RN and the leg LG.

When the recommended operation of the tire replacement scenario is not terminated (step S25 of FIG. 4: NO), and the tool RN and the leg LG as the second target are detected (step S27: YES), the CPU 140*a* executes a second scenario which is an AR scenario of the recommended operation in which tire replacement is performed using an arm rather than a leg (step S29). When the second scenario is executed, as shown in FIG. 13, the display image setting unit 165 causes the image AR6 and the text image TX5 to be displayed in the image display maximum region PN, in addition to the image AR5 (step S23). When the leg LG is not detected in accordance with the recommended operation of the second scenario (step S25: YES), the tire TR is detected (step S31: YES), and thus the CPU 140*a* executes the tire replacement scenario (step S21). Thereafter, the display image setting unit 165 causes the image AR5 to be displayed in the image display maximum region PN (step S23).

Figure 14:
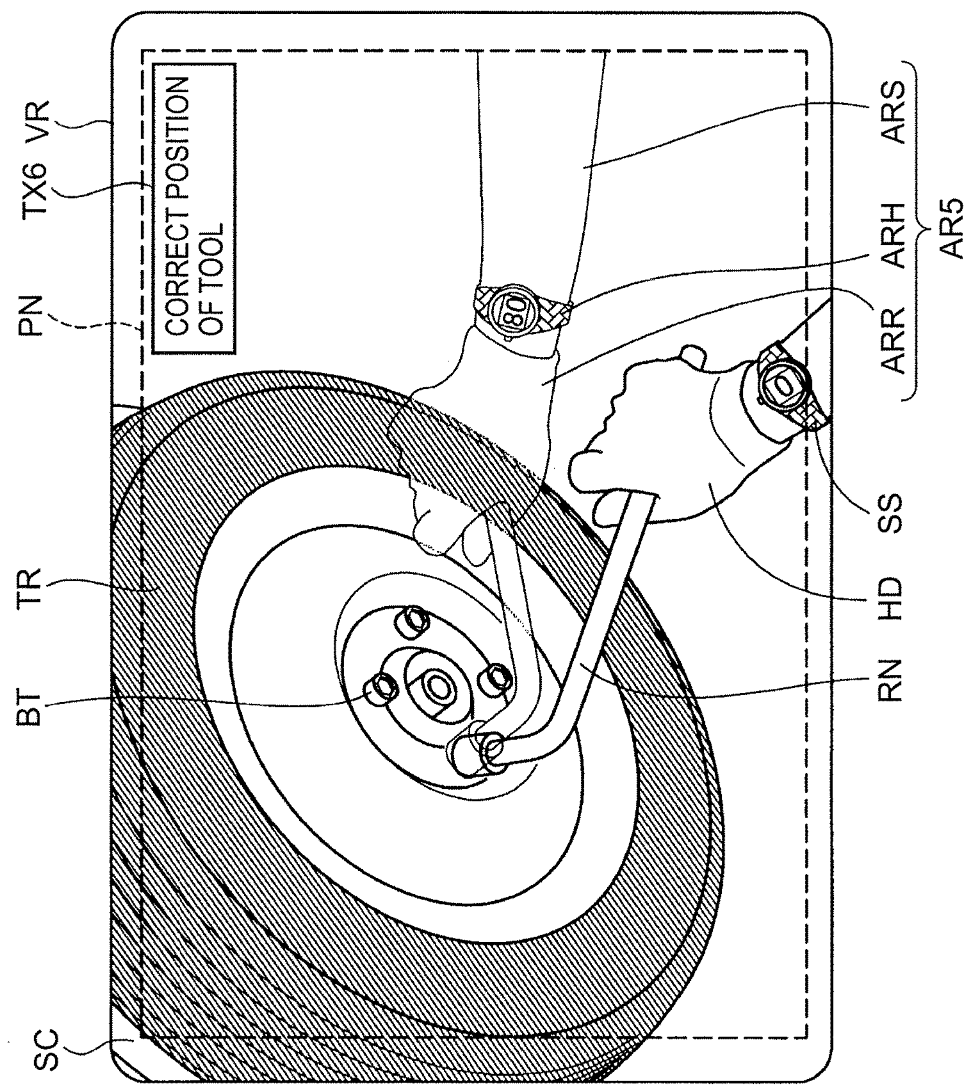
FIG. 14 is a diagram illustrating a field of view which is visually recognized by a user when the tire replacement scenario in which the first target is detected is executed.

FIG. 14 is a diagram illustrating a field of view VR which is visually recognized by a user when the tire replacement scenario in which the first target is detected is executed. FIG. 14 has the same image AR5 as in FIG. 12 displayed in the image display maximum region PN, and shows a field of view VR including a real user's arm HD, a muscular strength sensor SS mounted on the wrist of the arm HD, the tool RN held by the arm HD, and a text image TX6. As shown in FIG. 14, a position relationship between the tool image ARR and the real tool RN within the image AR5 and a position relationship between the arm image ARH and the arm HD are different from each other. In other words, the arm HD of a user and the tool RN do not overlap the image AR5 which is displayed as the recommended operation, and the object recognition unit 168 determines that the recommended operation of the tire replacement scenario is not performed by a user. The object recognition unit 168 specifies the position or direction of the tire TR depending on the positions and sizes of the plurality of bolts BT in the captured image. Therefore, the object recognition unit 168 can determine whether the real tool RN is inserted into a correct position with respect to a specified bolt BT of the tire TR. When it is determined that the detected tool RN is not inserted into a correct position, the display image setting unit 165 causes the text image TX6 for encouraging an operation of inserting the tool RN into a correct position with respect to the bolt BT to be displayed in the image display maximum region PN. Meanwhile, in FIG. 14, since the tool RN is not inserted into a correct position, a user is not able to rotate the tool RN, and the numerical value of the muscular strength sensor SS is displayed as 0(%).

When a user inserts the tool RN into a correct position with respect to the bolt BT in accordance with the text image TX6, the display image setting unit 165 sets the image AR5 not to be displayed, and the biological information processing unit 169 detects the numerical value of the muscular strength of the muscular strength sensor SS as the biological information acquisition sensor 90. The biological information processing unit 169 determines whether the tool RN is rotated outside of numerical values between 75% and 85% in which a value acquired by the muscular strength sensor SS centers on 80%. When it is determined that the tool RN is rotated between the numerical values, the display image setting unit 165 causes a text image for encouraging the rotation of the tool RN with a muscular strength of 80% to be displayed in the image display maximum region PN. When the biological information processing unit 169 determines that the tool RN is rotated with the muscular strength of 80%, the display image setting unit 165 sets the text image not to be displayed, and the display image setting unit 165 causes an AR image for removing another bolt BT to be displayed in the image display maximum region PN. When such an operation is repeated, the CPU 140*a* terminates the tire replacement scenario.

As described above, in the HMD 100*a* of the second embodiment, the display image setting unit 165 causes an image to be displayed in the image display maximum region PN, on the basis of a user's muscular strength which is detected by the biological information acquisition sensor 90. Therefore, in the HMD 100*a* of the second embodiment, an image obtained by adding the acquired biological information of a user to the specific target detected in the captured image can be visually recognized by a user, and thus a user's convenience is further improved.

C. Third Embodiment

Figure 15:
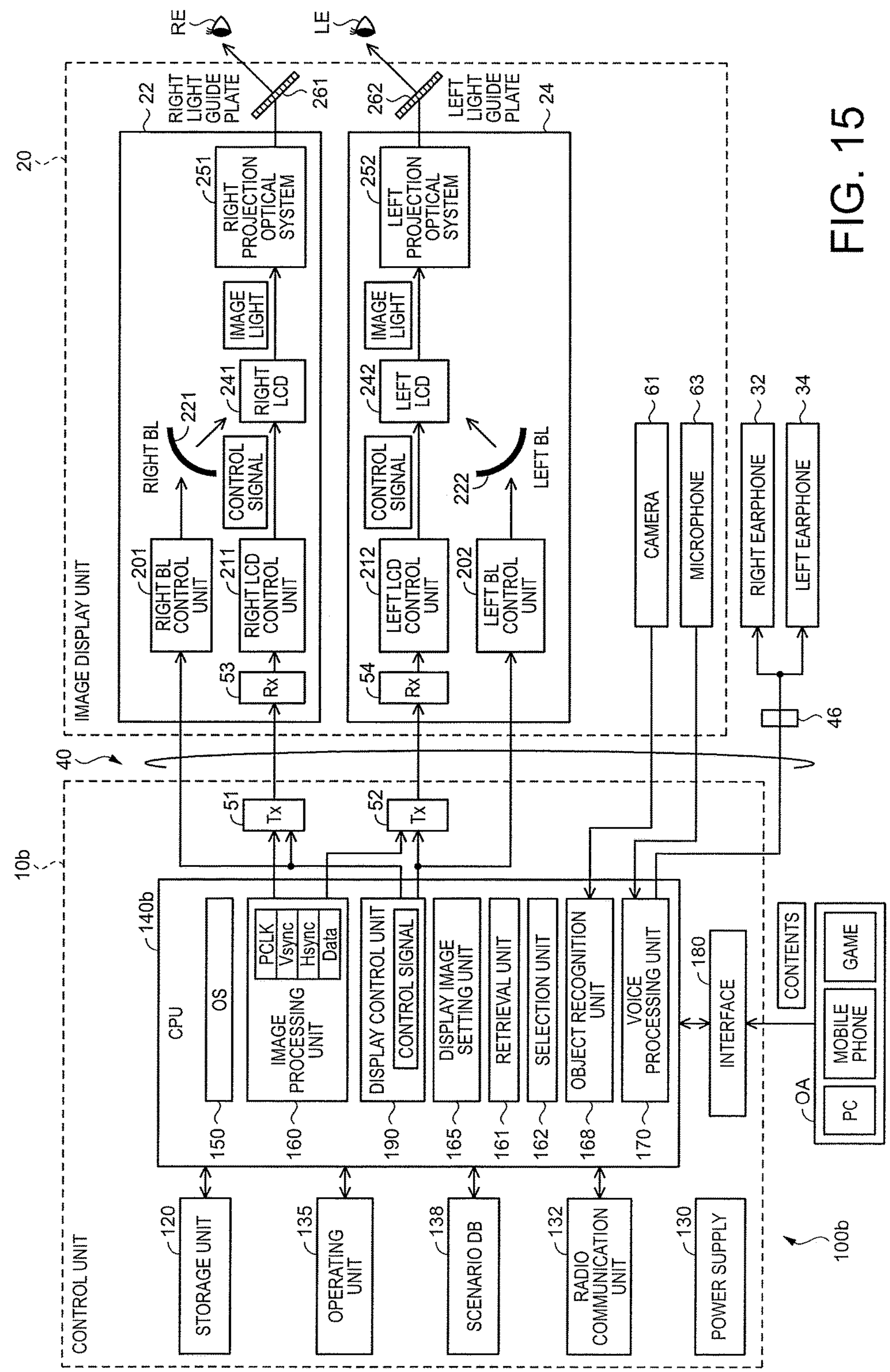
FIG. 15 is a functional block diagram illustrating a configuration of an HMD of a third embodiment.
Figure 16:
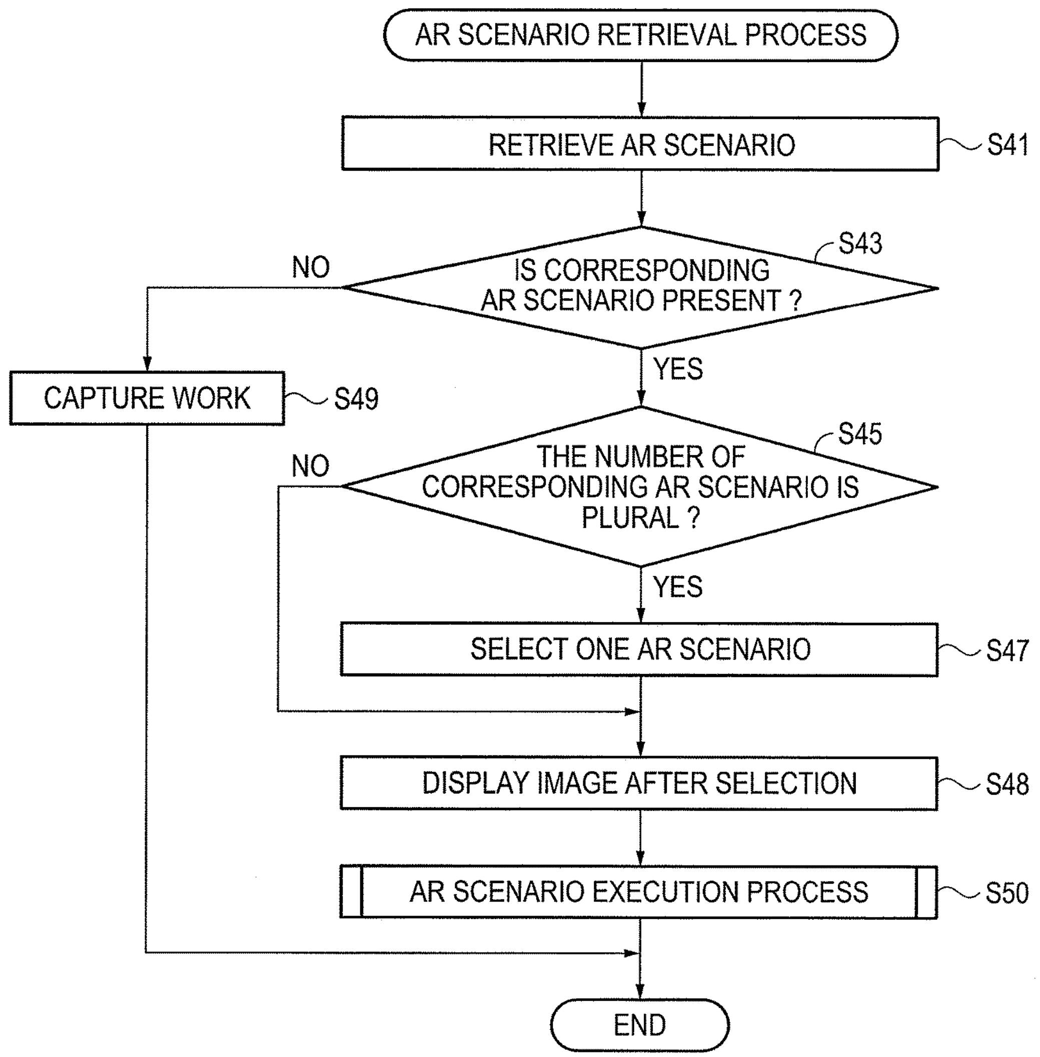
FIG. 16 is a flow diagram of an AR scenario retrieval process of the third embodiment.

FIG. 15 is a functional block diagram illustrating a configuration of an HMD 100*b* of a third embodiment. FIG. 16 is a flow diagram of an AR scenario retrieval process in the third embodiment. In the third embodiment, when a user of the HMD 100*b* starts some kind of work, the HMD 100*b* retrieves an AR scenario serving as a support moving image of the work through the Internet, and executes the retrieved AR scenario. For this reason, in the third embodiment, the AR scenario retrieval process of retrieving an AR scenario is mainly different from that in the above-mentioned embodiment. Meanwhile, the description of the same processes as those in the above-mentioned embodiment will be simplified. The details thereof will be described later. In the third embodiment, as an example of an AR scenario to be executed, a support moving image for the purpose of repairing water leakage when water leakage occurs in a faucet will be described by way of example.

As shown in FIG. 16, a CPU 140*b* of the HMD 100*b* of the third embodiment is different from that of the HMD 100 of the first embodiment, in that a retrieval unit 161 and a selection unit 162 are included therein, and other configurations are the same as those of the HMD 100 of the first embodiment. The retrieval unit 161 retrieves an AR scenario based on an operation or the like accepted by the operating unit 135, through the radio communication unit 132 from a server which stores a plurality of AR scenarios. The retrieval unit 161 retrieves the AR scenario based on the operation, for example, by comparing a word for retrieval which is input by the operation and a word with which the AR scenario stored in the server is associated. When the number of AR scenarios retrieved by the retrieval unit 161 is plural, the selection unit 162 selects one AR scenario of a plurality of AR scenarios on the basis of the operation or the like accepted by the operating unit 135. The selection unit 162 causes, for example, a character image indicating a plurality of AR scenarios and an image of an arrow moving on the image display maximum region PN on the basis of the operation accepted by the track pad 14 of the operating unit 135 to be displayed in the image display maximum region PN. The selection unit 162 selects an AR scenario indicated by the character image overlapping the arrow image in the image display maximum region PN by accepting a pressing input of the determination key 11, in a state where the arrow image overlaps the character image indicating one AR scenario. Meanwhile, in other embodiments, an operation based on a voice may be accepted instead of the operation which is accepted by the operating unit 135. In addition, a method of causing the selection unit 162 to select one AR scenario can also be modified in various ways, inclusive of selection based on a voice.

As shown in FIG. 16, in the AR scenario retrieval process of the third embodiment, the operating unit 135 initially accepts a predetermined operation, and thus the retrieval unit 161 retrieves an AR scenario which is desired to be executed by a user, from the server through the radio communication unit 132 (step S41). The retrieval unit 161 determines whether an AR scenario corresponding to the retrieved AR scenario is present (step S43). When it is determined that a corresponding AR scenario is present (step S43: YES), the retrieval unit 161 determines whether the number of corresponding AR scenarios is plural (step S45). When it is determined that the number of corresponding AR scenarios is not plural (step S45: NO), the CPU 140*b* performs a process of step S48 described later (step S50). In a process of step S45, when it is determined that the number of corresponding AR scenarios is plural (step S45: YES), the selection unit 162 selects one AR scenario as an AR scenario to be executed (step S47).

FIG. 17 is a diagram illustrating an example an image which is displayed when one AR scenario to be executed is selected from a plurality of AR scenarios. The image shown in FIG. 17 is an example of an image of a faucet BB associated with a corresponding AR scenario when "water leakage" and "faucet" are retrieved as keywords. As shown in FIG. 17, the image of the faucet BB shows an image in which a water drop TD drips from each of four water leakage places WL1, WL2, WL3, and WL4. In the third embodiment, the selection unit 162 causes the arrow image moving within the image display maximum region PN by operating the operating unit 135 to be displayed in the image display maximum region PN, in addition to the image of the faucet BB. The selection unit 162 changes the position of the arrow image displayed in the image display maximum region PN, in association with the operation accepted by the track pad 14 of the operating unit 135. When the determination key 11 is pressed in a state where the arrow image and the image indicating either water leakage place of the four places overlap each other within the image display maximum region PN, the selection unit 162 selects an AR scenario associated with the water leakage place indicated by the overlapped image, as one AR scenario to be executed.

In the process of step S47 of FIG. 16, when one AR scenario is selected, the selection unit 162 causes an image after selection, which is included in the selected AR scenario and is previously set to be displayed in the image display maximum region PN after the selection, to be displayed in the image display maximum region PN (step S48). Meanwhile, when the image after selection is not associated with the AR scenario selected by the selection unit 162, the process of step S48 is not performed, and the AR scenario execution process of step S50 described later is performed.

FIG. 18 is a diagram illustrating an example of an image after selection which is displayed after one AR scenario is selected. FIG. 18 shows an image of the faucet BB indicating the water leakage place WL2 selected as a water leakage place, a part image IMPT indicating an enlarged O-ring which is a replacement part required for repairing the water leakage place WL2, and an arrow image CS indicating by which portion of the faucet BB the replacement part is replaced. In this manner, the display image setting unit 165 causes an image indicating information on the replacement part used for work to be performed by a user within the AR scenario to be executed to be displayed in the image display maximum region PN.

Figure 19:
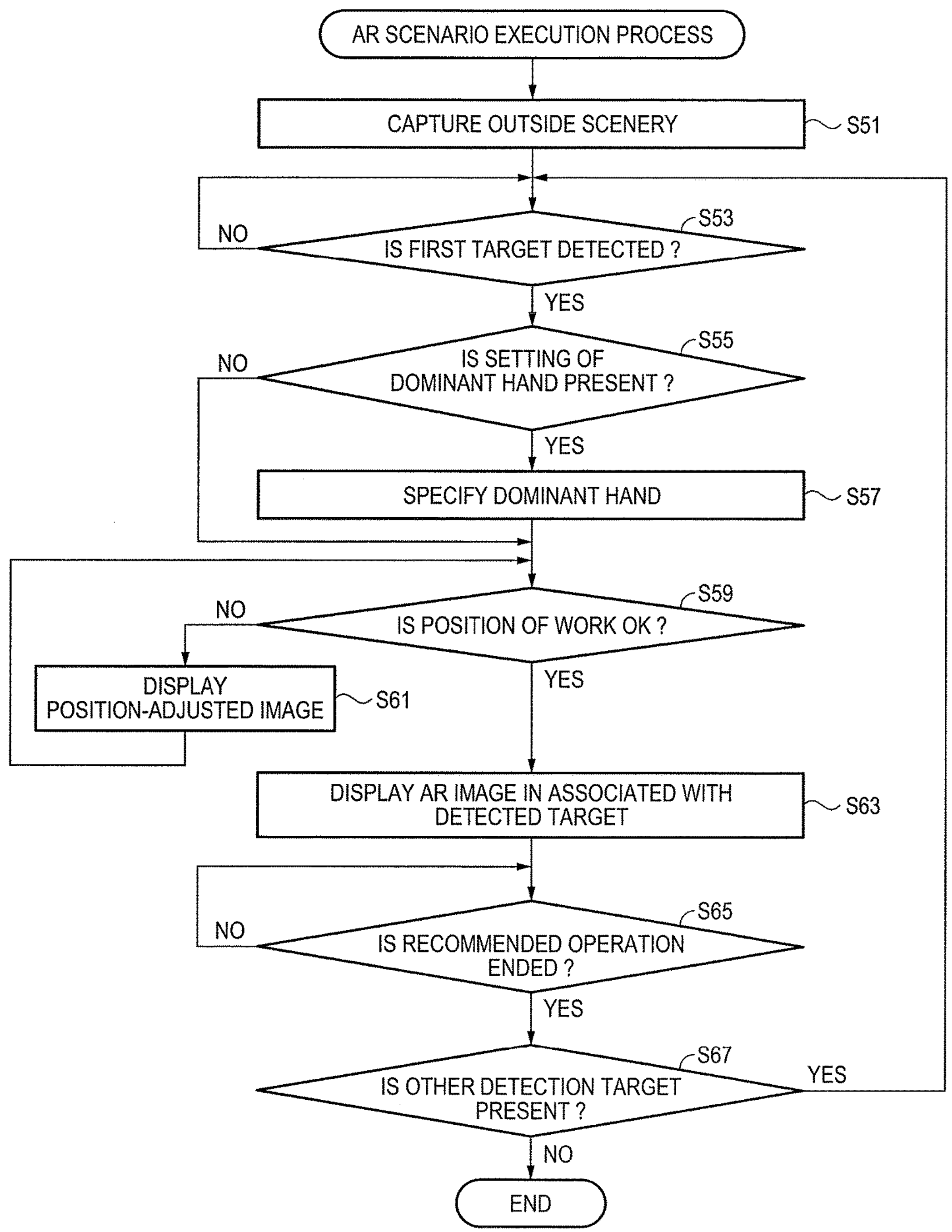
FIG. 19 is a flow diagram of an AR scenario execution process of the third embodiment.

When the process of step S48 of FIG. 16 is performed, the CPU 140*b* performs the AR scenario execution process of executing the selected AR scenario. FIG. 19 is a flow diagram of the AR scenario execution process in the third embodiment. In the AR scenario execution process of the third embodiment, initially, the CPU 140*b* captures an image of outside scenery through a camera 61*b* (step S51). Next, the object recognition unit 168 detects the first target which is previously associated with the AR scenario to be executed, from the captured image of the captured outside scenery (step S53). The first target in the AR scenario which is executed in the third embodiment is the faucet BB included in outside scenery which is a target for repairing water leakage. When the faucet BB as the first target is detected from the captured image (step S53: YES), the object recognition unit 168 determines whether the setting of a dominant hand is present in the AR scenario to be executed (step S55). In the AR scenario in which the setting of the dominant hand is performed, when the AR scenario is executed, the position or direction of the image displayed in the image display maximum region PN is set in accordance with the dominant hand. In the AR scenario executed in the third embodiment in which water leakage of the faucet BB is repaired, a tool is used, and thus the setting of the dominant hand is performed in advance in the AR scenario.

In the process of step S55, when it is determined that the setting of the dominant hand is not performed in advance in the AR scenario which is executed (step S55: NO), the object recognition unit 168 performs the process of step S59 described later. In the process of step S55, when it is determined that the setting of the dominant hand is performed in advance (step S55: YES), the object recognition unit 168 determines a user's dominant hand of the HMD 100*b* (step S57). In the third embodiment, the object recognition unit 168 determines a user's dominant hand by causing an image for selecting whether the user's dominant hand is a right hand or a left hand through the operating unit 135 to be displayed in the image display maximum region PN, and accepting a predetermined operation from a user. Meanwhile, in other embodiments, by the information of a user of the HMD 100*b* being registered in advance, a user's dominant hand may be automatically determined, or the user's dominant hand may be determined by a voice input. In addition, without performing a process of setting a user's dominant hand, the dominant hand is temporarily determined as a right hand, and then a process included in the AR scenario which is executed may be performed.

When the user's dominant hand is specified (step S57), the object recognition unit 168 determines whether the captured position of a user at this point of time is appropriate, as the position of work encouraged in the AR scenario which is executed (step S59). The camera 61*b* of the third embodiment is a stereo camera constituted by two cameras. Therefore, the object recognition unit 168 can measure a distance between the user and the faucet BB included in the outside scenery SC, through trigonometry, using the image AR1 of the faucet BB in the captured image of the camera 61*b* and the position coordinates of the camera 61*b*. When the measured distance between the user and the faucet BB is falls within a predetermined distance which is set in advance, the object recognition unit 168 determines that the position of a user's work is appropriate.

Figure 20:
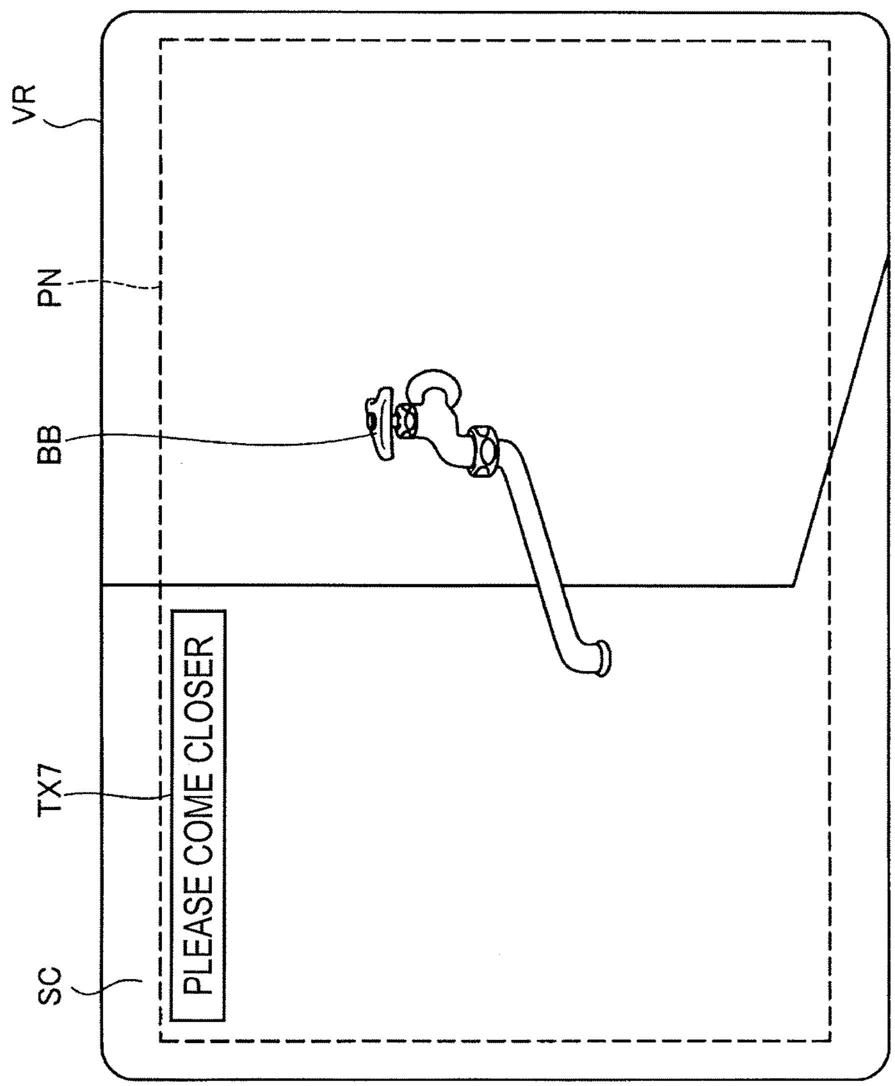
FIG. 20 is a diagram illustrating a field of view which is visually recognized by a user when a position-adjusted image for a user is displayed.

In the process of step S59, when it is determined that the position of the user's work is not appropriate (step S59: NO), the object recognition unit 168 causes a position-adjusted image for encouraging the change of a user's position to be displayed in the image display maximum region PN (step S61). FIG. 20 is a diagram illustrating a field of view VR which is visually recognized by a user when a position-adjusted image for a user is displayed. FIG. 20 shows the outside scenery SC including the faucet BB and a text image TX7 as a position-adjusted image displayed in the image display maximum region PN. The text image TX7 is a character image for encouraging a user to get closer to the faucet BB. In the third embodiment, the text image TX7 is displayed at the upper left in the image display maximum region PN. Meanwhile, the position at which the text image TX7 is displayed in the image display maximum region PN can be modified in various ways, and may be displayed, for example, in the center of the image display maximum region PN.

When the process of step S61 of FIG. 19 is performed, the object recognition unit 168 performs the process of step S59 again. In the process of step S59, when it is determined that the present position of a user is appropriate as the position of work to be performed by the user (step S59: YES), the display image setting unit 165 causes the AR image associated with the first target to be displayed in the image display maximum region PN in association with the position of the first target (step S63).

Figure 21:
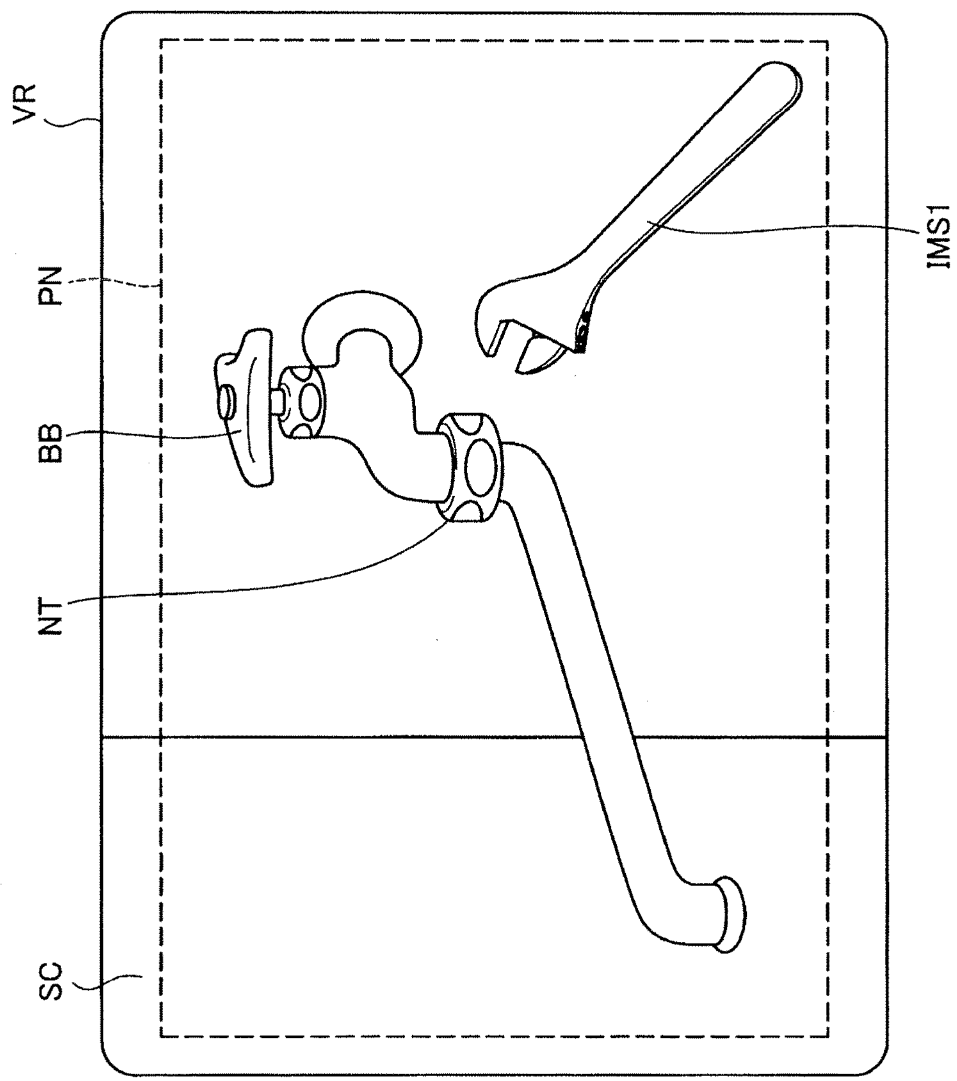
FIG. 21 is a diagram illustrating a field of view which is visually recognized by a user when a faucet as a first target is detected in the third embodiment.
Figure 22:
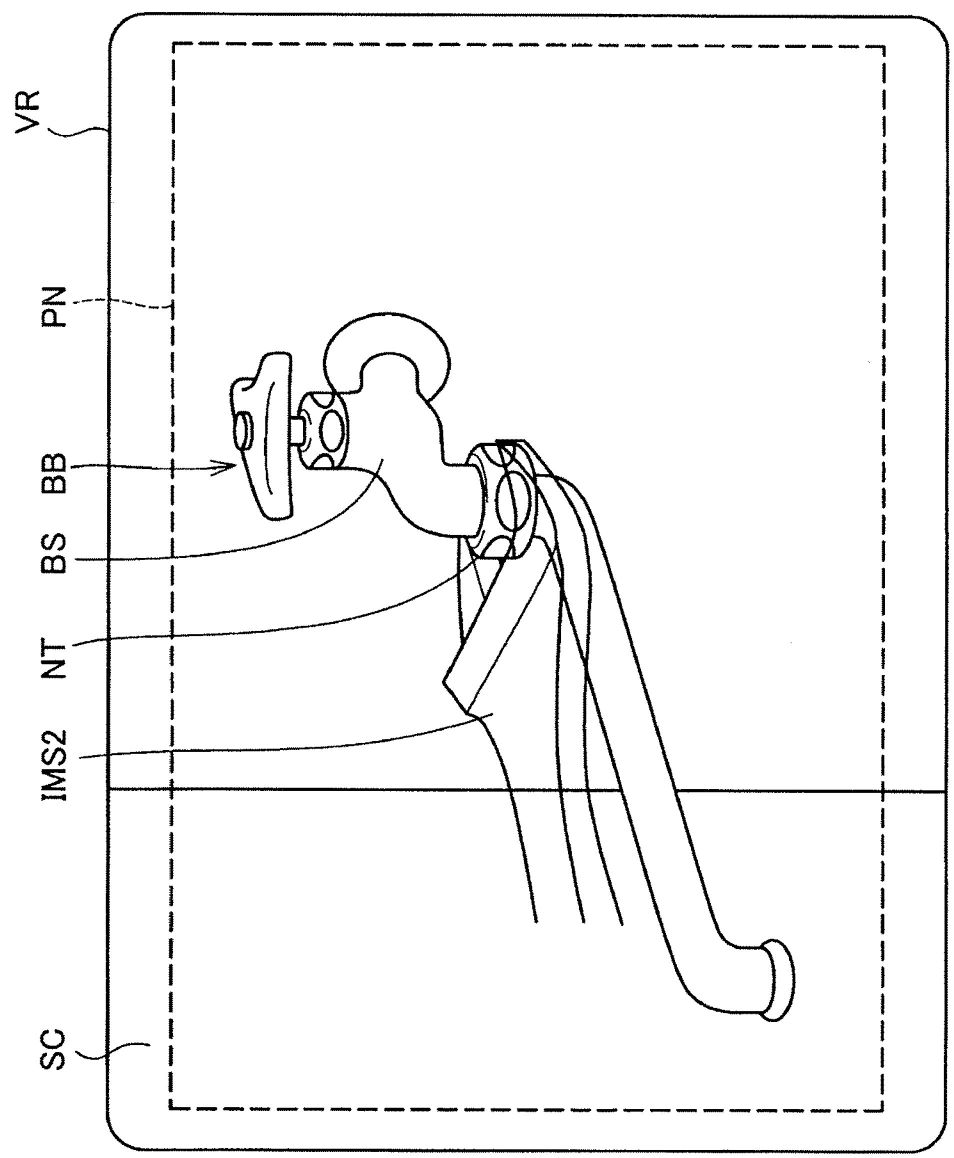
FIG. 22 is a diagram illustrating a field of view which is visually recognized by a user when the faucet as the first target is detected in the third embodiment.

FIGS. 21 and 22 are diagrams illustrating a field of view VR which is visually recognized by a user when the faucet BB as the first target is detected in the third embodiment. FIGS. 21 and 22 show tool images IMS1 and IMS2 which are images of wrenches of tools which are displayed in the image display maximum region PN in association with the detected position of the faucet BB, using the real faucet BB included in the outside scenery SC as the first target. Each of the images shown in FIGS. 21 and 22 is one scene of a moving image in which an image of the same wrench is changed from the tool image IMS1 to the tool image IMS2. A specific moving image includes a moving image in which the display image setting unit 165 is configured such that the tool image IMS1 gradually comes close to a nut portion NT of the faucet BB in the image display maximum region PN, the nut portion NT is grasped at the apex of a wrench which is the tool image IMS1, and the nut portion NT is rotated in a loosening direction (anticlockwise). In this manner, the tool images IMS1 and IMS2 shown in FIGS. 21 and 22 indicate work for a user to remove the nut portion NT of the faucet BB from a base portion BS using a wrench, as work to be performed by the user.

In step S63 of FIG. 19, after the moving images shown in FIGS. 21 and 22 are displayed in the image display maximum region PN, the object recognition unit 168 determines whether a user performs a recommended operation to be performed by the user depending on the moving images (step S65). The object recognition unit 168 determines whether an operation of removing the nut portion NT from the base portion BS of the faucet BB as the recommended operation has been performed, depending on whether a position relationship between the base portion BS and the nut portion NT falls within a predetermined distance. When it is determined that the nut portion NT is farther away from the base portion BS than the predetermined distance, the object recognition unit 168 determines that the nut portion NT is removed from the base portion BS. For example, when the base portion BS is included in the image capture range of the camera 61*b* and the nut portion NT is not included therein, the object recognition unit 168 determines that the recommended operation in which the nut portion NT is removed from the base portion BS has been performed.

When it is determined that the recommended operation is not performed (step S65: NO), the object recognition unit 168 continuously waits for the performing of the recommended operation. when it is determined that the recommended operation has been performed (step S65: YES), the object recognition unit 168 determines whether a detection target associated with an operation to be performed by a user is present after the recommended operation performed in the AR scenario which is executed (step S67).

In the AR scenario which is executed in the third embodiment, the single base portion BS of the faucet BB is set as a detection target associated with a recommended operation next to the operation in which the nut portion NT is removed from the faucet BB. For this reason, in step S67, the object recognition unit 168 determines that other detection targets are present in the AR scenario which is executed (step S67: YES), and determines whether the base portion BS having the nut portion NT removed therefrom as a new first target has been detected (step S53). When the base portion BS is detected (step S53: YES), the setting of the dominant hand has already been performed (step S55: YES, step S57), and thus the object recognition unit 168 determines whether the work position of a user is appropriate (step S59). When it is determined that the work position of a user is appropriate (step S59: YES), the display image setting unit 165 causes the AR image associated with the detected base portion BS to be displayed in the image display maximum region PN (step S63).

Figure 23:
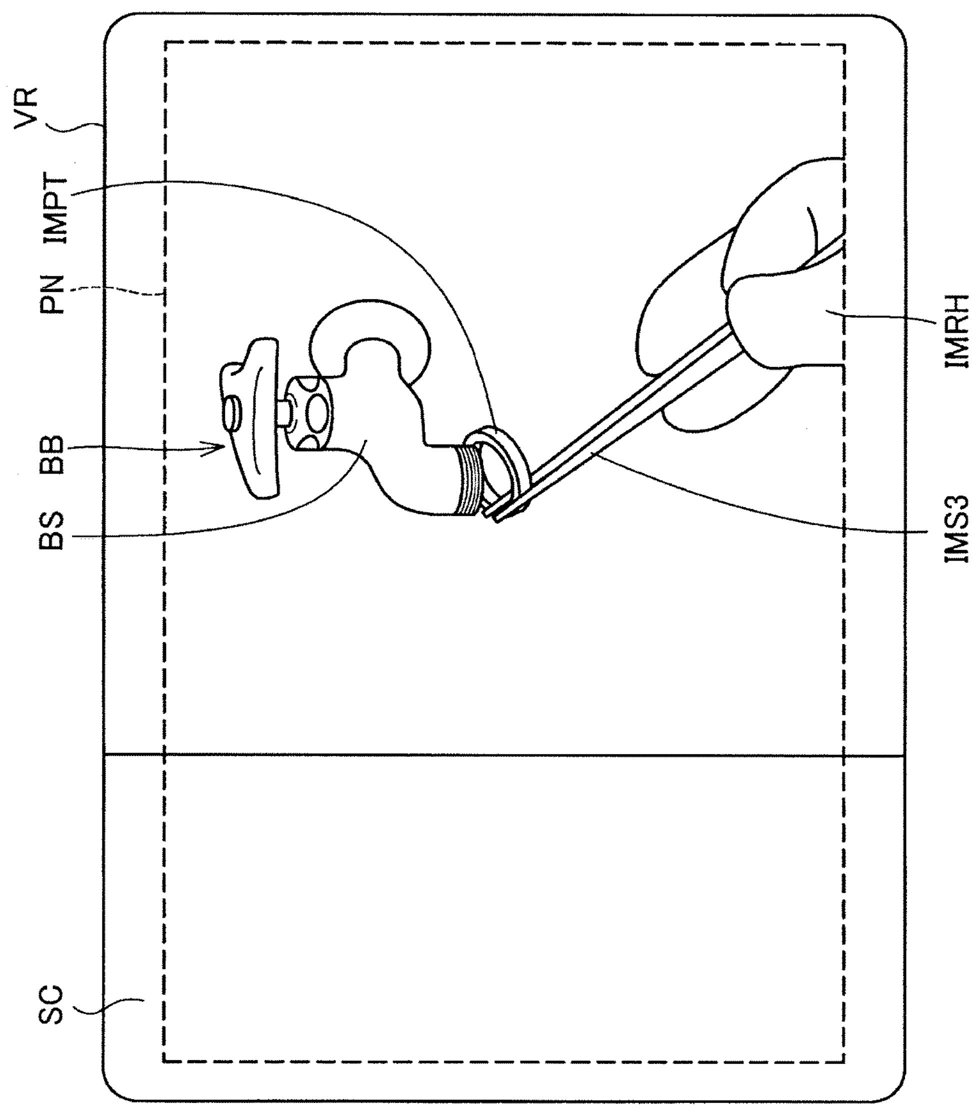
FIG. 23 is a diagram illustrating a field of view which is visually recognized by a user when a base portion of the faucet as the first target is detected in the third embodiment.
Figure 24:
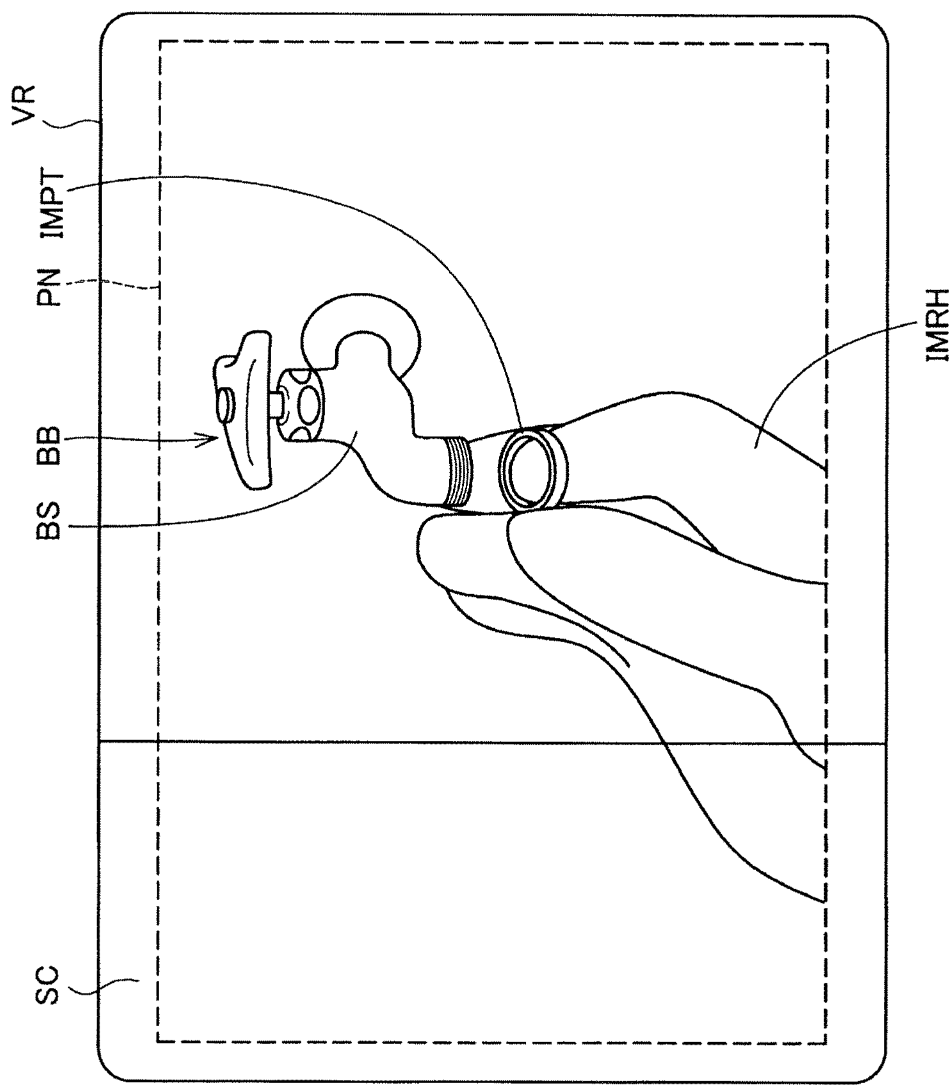
FIG. 24 is a diagram illustrating a field of view which is visually recognized by a user when the base portion of the faucet as the first target is detected in the third embodiment.

FIGS. 23 and 24 are diagrams illustrating a field of view VR which is visually recognized by a user when the base portion BS of the faucet BB as the first target is detected in the third embodiment. FIGS. 23 and 24 show an image which is one scene of a moving image which is displayed in the image display maximum region PN associated with the position of the base portion BS, using the base portion BS having the nut portion NT removed therefrom as the first target. Display images include the part image IMPT of an O-ring as a replacement part, a tool image IMS3 indicating tweezers which are a tool for grasping the O-ring, and a right hand image IMRH indicating the movement of a hand grasping the tool or the O-ring. The display image setting unit 165 causes a moving image indicating the movement of the part image IMPT for changing the O-ring to be displayed in the image display maximum region PN. A specific moving image is a moving image in which, after the image shown in FIG. 23 is displayed in the image display maximum region PN, the O-ring is removed by a tool grasped by a right hand while, and then a new O-ring is grasped by the right hand, and a change up to the image shown in FIG. 24 in which the new O-ring is moved to the apex of the base portion BS is shown. Meanwhile, the image which is changed from the image shown in FIG. 23 to the image shown in FIG. 24 is equivalent to a second moving image in the aspect of the invention.

When the process of step S63 of FIG. 19 is performed, the object recognition unit 168 determines whether a user has terminated the recommended operation (step S65). When it is determined that the recommended operation is performed and terminated (step S65: YES), the object recognition unit 168 determines whether a detection target associated with an operation which is next performed is present in the AR scenario which is executed (step S67).

In the AR scenario which is executed in the third embodiment, the base portion BS of the faucet BB into which the O-ring is inserted is set as the detection target associated with an operation to be performed by a user next to the operation for encouraging replacement work of the O-ring. The determination of the detection of the base portion BS into which the O-ring is inserted is performed depending on the presence or absence of the detection of the O-ring which is located inside the apex of the base portion BS. That is, the position of a user's head is changed so that the camera 61*b* is set to an angle by which an image of the inside of the base portion BS can be captured, and then the detection of the base portion BS having the O-ring mounted thereon as a detection target can be determined.

Figure 25:
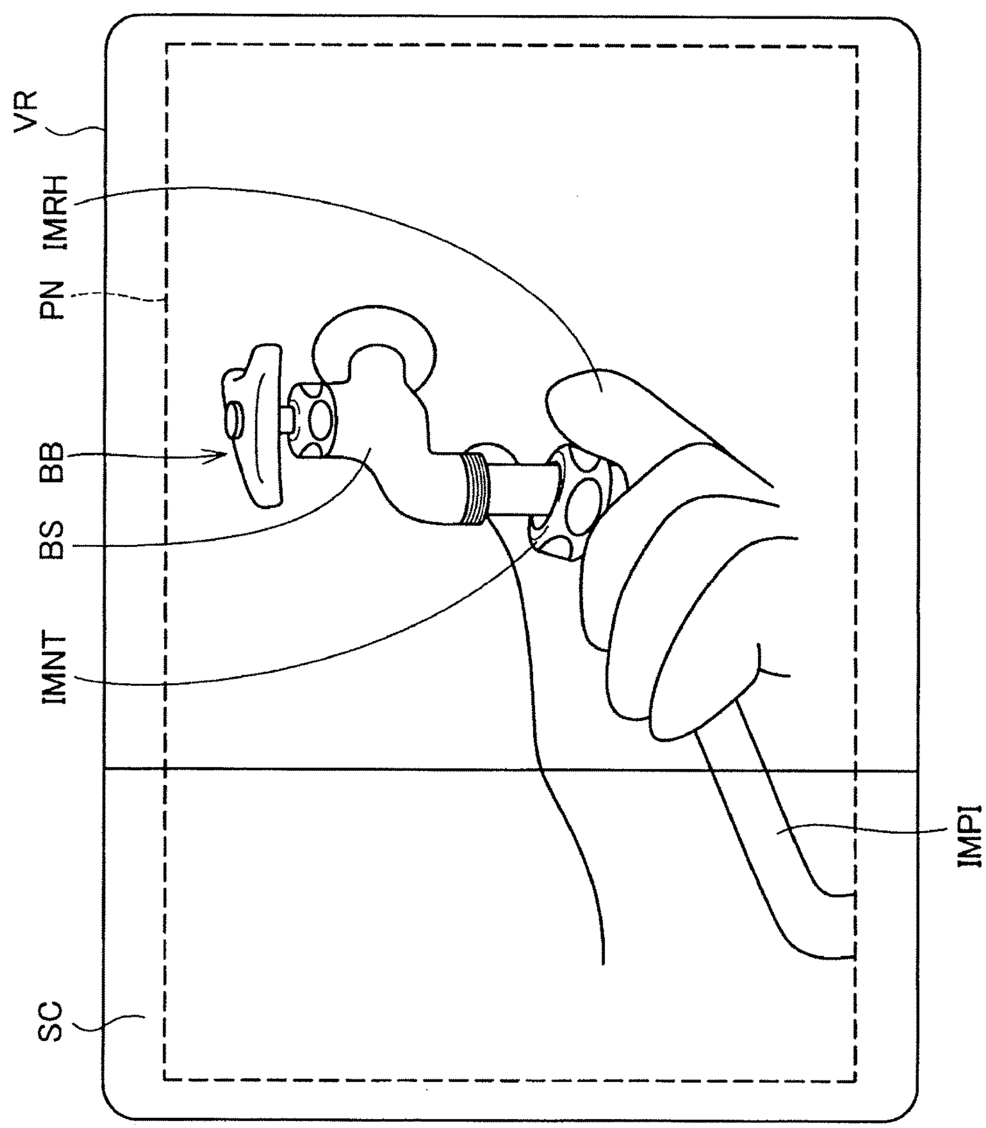
FIG. 25 is a diagram illustrating a field of view which is visually recognized by a user when the base portion of the faucet after an O-ring is replaced as a first target is detected in the third embodiment.

In the process of step S67, the object recognition unit 168 determines that other detection targets are present in the AR scenario which is executed (step S67: YES), and the CPU 140*b* performs processes of step S53 and the subsequent steps. FIG. 25 is a diagram illustrating a field of view VR which is visually recognized by a user when the base portion BS of the faucet BB after the O-ring is replaced as the first target is detected in the third embodiment. FIG. 25 shows a nut image IMNT of the nut portion NT displayed in the image display maximum region PN, the right hand image IMRH indicating a right hand grasping the nut portion NT, and a pipe image IMPI indicating a water discharge pipe connected to the real base portion BS, after the first target is detected. The display image setting unit 165 causes a moving image until the nut image IMNT is rotated from the image shown in FIG. 25, moves up along the pipe image IMPI, and the nut image IMNT is fixed to the base portion BS to be displayed in the image display maximum region PN.

When the process of step S63 of FIG. 19 is performed, and then a recommended operation of mounting the water discharge pipe on the base portion BS is performed by a user (step S65: YES), the object recognition unit 168 determines whether a detection target associated with an operation which is next performed by a user is present in the AR scenario which is executed (step S67). In the AR scenario which is executed in the third embodiment, the faucet BB in a state where the water discharge pipe is mounted to the base portion BS by the nut portion NT is set as a new detection target. The faucet BB in a state indicated by the detection state is, in other words, the faucet BB in a state before the replacement of the O-ring is performed.

In the AR scenario which is executed, since other detection targets are present in the process of step S67 (step S67: YES), the CPU 140*b* repeats the processes of step S53 and the subsequent steps. When the faucet BB in a state where the water discharge pipe and the nut portion NT are mounted on the base portion BS is detected, the display image setting unit 165 causes a character image for inquiring whether work has been terminated to be displayed in the image display maximum region PN (step S63). By a voice input or a predetermined operation for the operating unit 135 being accepted, the CPU 140*b* accepts a response to work termination as the recommended operation (step S65: YES), and the object recognition unit 168 determines whether a detection target associated with an operation to be performed by a user next to the recommended operation performed in the AR scenario which is executed (step S67). In the AR scenario which is executed in the third embodiment, since an operation to be performed by a user which is set after the replacement work termination is not present, that is, a detection target which is set is not present (step S67: NO), the CPU 140*b* terminates the AR scenario execution process. In the AR scenario retrieval process of FIG. 16, the CPU 140*b* performs the AR scenario execution process of step S50, and then terminates the AR scenario retrieval process.

In the process of step S43, when it is determined that the AR scenario corresponding to the retrieved AR scenario is not stored in a server (step S43: NO), the retrieval unit 161 captures an image of outside scenery through the camera 61*b* (step S49). In the third embodiment, when the AR scenario corresponding to the retrieved AR scenario is not present in the server, the CPU 140*b* captures an image of work scheduled to be executed by a user from now on, and thus creates the retrieved AR scenario, or saves image capture data required for creating the retrieved AR scenario. The CPU 140*b* saves an AR scenario or image capture data which are to be saved, in association with a word retrieved by step S41. Thereby, when a user different from the user who executes the AR scenario in the third embodiment retrieves the AR scenario, the AR scenario or the image capture data saved by the process of step S49 can be viewed.

As described above, in the third embodiment, a user of the HMD 100*b* can acquire and execute a desired AR scenario from a server or the like which is connected through the radio communication unit 132. In addition, when the desired AR scenario is not present, the camera 61*b* of the HMD 100*b* captures an image of the outside scenery, and thus it is possible to create another user's possibly desired AR scenario or image capture data.

In addition, in the HMD 100*b* of the third embodiment, when a moving image indicating a recommended operation to be performed in the AR scenario which is executed is displayed in the image display maximum region PN, the object recognition unit 168 determines whether a recommended operation which is set as an operation to be performed by a user next thereto is present. In the AR scenario which is executed, when it is determined that a recommended operation to be next performed by a user is present, the display image setting unit 165 causes a moving image indicating a recommended operation to be next performed by a user to be displayed in the image display maximum region PN, as a second moving image. Therefore, in the HMD 100*b* of the third embodiment, a different moving image in which work according to a plurality of procedures is adjusted to the detection of a different target is visually recognized by a user, and thus a user's convenience is improved.

D. Modification Examples

Meanwhile, the invention is not limited to the above-mentioned embodiments, and can be implemented in various aspects without departing from the scope of the invention. For example, the following modifications can be made.

D-1. Modification Example 1

In the above-mentioned embodiment, the first target detected from the captured image is one object, but may be a plurality of objects without being limited thereto. For example, the object recognition unit 168 may detect a combination inclusive of the positions of a plurality of objects from the captured image, as the first target. In addition, only when a specific target performs a specific movement even in a case where the target is the same specific target, the object recognition unit 168 may perform detection as the first target. In addition, the object recognition unit 168 detects a plurality of specific targets, and a user selects one specific target from the plurality of specific targets, and thus the selected specific target may be detected as the first target.

In the above-mentioned first embodiment, when the kitchen knife KN as the second target is detected, the AR scenario to be executed is changed to the second scenario, but a change from the first scenario to other scenarios can be modified in various ways. For example, when the position or movement of the real scale remover is greatly different from that of the arrow image CS1 even in a case where the real scale remover is detected during the execution of the first scenario of the "scale remover", the CPU 140 may execute another AR scenario by the second target being detected.

In the above-mentioned embodiment, the first target is detected from the captured image by image recognition such as pattern matching, but a method of detecting the first target can be modified in various ways without being limited thereto. For example, the object recognition unit 168 may detect the first target by measuring a distance from a depth sensor to the first target through a TOF (Time-of-Flight) method or the like, using the depth sensor or the like, rather than image recognition for the captured image.

The image of the specific target which is detected from the captured image can be modified in various ways without being limited to the example of the above-mentioned embodiment. For example, when the specific target is an actual object which is detected from the captured image, the target can be associated with the AR scenario. As in the above-mentioned embodiment, the specific target may be the fish FS capable of moving by a person carrying the fish, and may be an unmovable building structure or the like. In addition, the specific target may be the sun or the like which regularly moves with the lapse of time. In addition, the association of the first target and the first moving image with each other in the aspect of the invention includes the execution of the AR scenario of the detected specific target through the detection of some kind of target as the specific target from the outside scenery SC. The association of the first target and the first moving image with each other includes, for example, the execution of the AR scenario through the detection of an image of the specific target from the captured image, the detection of a specific shape from the outside scenery SC using a depth sensor or the like, or the detection of some kind of target at a specific distance from the image display unit 20 using the depth sensor.

In the above-mentioned embodiment, the category of the scenario DB 138 is selected, and then the first target of the AR scenario included in the selected category is detected from the captured image, but the setting of the AR scenario serving as the first target can be modified in various ways. For example, the object recognition unit 168 may detect the first target associated with all the AR scenarios from the captured image without classifying the AR scenarios into categories.

A method of executing the AR scenario in association with the first target can be modified in various ways without being limited to the example of the above-mentioned embodiment. For example, the scenario DB 138 not only classifies and stores a plurality of AR scenarios into several categories, but may also store the position of the first target in the captured image, the movement of the first target, the order of the detected specific targets, the direction of the first target in the captured image, and the table of a combination of the above and an acquired external voice. For example, when one specific target detected from the captured image is detected, and the operation of the detected specific target which is set in advance within a predetermined time is detected, the CPU 140 may execute the AR scenario which is stored in association with the scenario DB 138. In addition, when the whole cake is detected as the first target, and "division into eight pieces" or "division into six pieces" as an external voice is acquired, an AR scenario in which a knife for cutting the cake and a position at which the detected cake is cut are displayed as AR images may be executed. In this modification example, since various AR scenarios are selected by a plurality of elements, a user can simply select a desired AR scenario from various AR scenarios.

In the above-mentioned embodiment, when the specific target is detected, one AR scenario is executed, but the number of AR scenarios to be executed may be plural without necessarily being limited to one. For example, the CPU 140 executes all the AR scenarios associated with the first target, and then may limit the number of AR scenarios to be executed to several, from a plurality of AR scenarios which are executed, on the basis of a specific target different from the first target detected thereafter.

In the above-mentioned embodiment, when there are a plurality of AR scenarios associated with the first target, one AR scenario is selected on the basis of an operation accepted by the operating unit 135, but a method of selecting one AR scenario from a plurality of AR scenarios can be modified in various ways. For example, when there are a plurality of AR scenarios associated with the first target, the CPU 140 may select an AR scenario which has been recently executed, as a first scenario to be executed.

The moving image in the aspect of the invention includes flip book animation or the like which is a combination of still images, and also includes a moving image which is changed so as to have a different size in the same image. The term "moving image" as used herein refers to a wide concept other than a still image having no change with the lapse of time, and also includes an image in which a combination of a plurality of still images changes.

In addition, an image included in an AR scenario can be modified in various ways, and may be generated as a semi-transparent AR image or a two-dimensional image by changing RGB data. For example, in the example shown in FIG. 6, regarding the image AR1 of the "scale remover", the semi-transparent image of the human hand holding the scale remover may be displayed in the image display maximum region PN simultaneously with the image AR1 of the scale remover. In this modification example, when a user who executes an AR scenario does not know how to hold the scale remover or the like, the semi-transparent image of the human hand is displayed in the image display maximum region PN in association with the image AR1 of the scale remover, and thus a user's convenience is improved.

In the above-mentioned embodiment, the angle of view of the camera 61 and the field of view that passes through the optical image display units 26 and 28 and is visually recognized by a user are set in advance so as to correspond to each other, but are not necessarily required to be set so as to correspond to each other, and the setting of the above can be modified in various ways. For example, the operating unit 135 accepts an operation, and thus the angle of view of the camera 61 may be changed. In addition, the CPU 140 causes an image for calibration to be displayed in the image display maximum region PN to thereby encourage a user to perform a predetermined operation, and thus the angle of view of the camera 61 may be adjusted.

In the above-mentioned second embodiment, the biological information acquisition sensor 90 has been described by taking an example of the muscular strength sensor SS, but can be modified in various ways. For example, the biological information acquisition sensor 90 may be a sensor that acquires a user's pulse, diaphoresis state or the like. The biological information acquisition sensor 90 detects reflected light by emitting infrared rays to an arm, and thus can also acquire waveforms with respect to a flow of blood.

In the above-mentioned second embodiment, the numerical value of recommended muscular strength which is displayed by the muscular strength sensor SS is 80%, but these values can be modified in various ways. For example, instead of the muscular strength sensor SS, torque wrench and a muscular strength are associated with each other, and thus how much torque is applied to the tool RN may be displayed on the basis of distortion which is acquired by the muscular strength sensor SS.

In the above-mentioned second embodiment, the use of the muscular strength sensor SS as the biological information acquisition sensor 90 has been described by way of example, but the setting of the biological information acquisition sensor 90 can be modified in various ways. For example, with respect to a user's grip strength, an operation in which arm or the like is rotated and a state where a torque wrench or a golf club is gripped, multiple times of measurement are performed in advance, and a relationship between a maximum value or an average value obtained from such measurement and the AR scenario associated with the muscular strength sensor SS or the like may be set. More specifically, when the biological information acquisition sensor 90 and the tool which are used in a specific AR scenario are determined, measurement when the tool is used is performed in advance and is reflected in an AR scenario, and thus the CPU 140 can cause a user who executes the AR scenario to recognize a work support image or the like which also includes a "trick" or the like.

D-2. Modification Example 2

In the above-mentioned embodiment, the determination of the termination of the recommended operation of the AR scenario is performed by a person's movement or the like detected from the captured image, but can be modified in various ways. For example, the termination of the recommended operation is not determined by the object recognition unit 168 detecting a predetermined operation, but may be determined by a voice (for example, "terminate") which is acquired by the microphone 63.

In the above-mentioned embodiment, when the second target is detected during the execution of the first scenario, this corresponds to an aspect in which the second scenario is executed, but a relationship between the first scenario and the second scenario can be modified in various ways without being limited to such a relationship. For example, the first scenario and the second scenario may be put together and then be handled as one compounded AR scenario. In this case, when the second target in the above-mentioned embodiment is detected during the execution of one AR scenario by the CPU 140, it can be said, in other words, that branching is performed in the AR scenario which is executed.

In the above-mentioned embodiment, when the second target is detected, the second scenario is executed, but the second scenario is not necessarily required to be executed. For example, when the first target is detected and the first scenario is executed, the CPU 140 may not detect a specific target which is not associated with the first scenario.

In the above-mentioned embodiment, the display image setting unit 165 causes an AR image to be displayed in the image display maximum region PN in association with the position of the fish FS or the like as the detected first target, but the position at which an image is displayed can be modified in various ways. For example, when a specific target is detected, the display image setting unit 165 may set a position at which the AR image is displayed, in relation with the image display maximum region PN, regardless of the position of the specific target.

In the above-mentioned embodiment, the AR scenario for supporting a user's work has been described by taking an example of a method of cooking the fish FS or a method of replacing the tire TR, but can be modified in various ways without being limited thereto. For example, the above scenario may be an AR scenario for supporting specific work of a factory, and may be an AR scenario for lecturing on how to use sporting goods in sports such as in golf.

In the above-mentioned embodiment, the microphone 63, the earphones 32 and 34, and the voice processing unit 170 are included in the configuration of the HMD 100, but these components are not necessarily required, and the microphone 63 or the like may not be included therein.

In the above-mentioned third embodiment, when it is determined that the position of a user's work is not appropriate (step S59 of FIG. 19: NO), the display image setting unit 165 causes the position-adjusted image shown in FIG. 20 to be displayed in the image display maximum region PN. On the other hand, when the position of a user's work or the like is not appropriate, an image or a moving image which is caused to be displayed in the image display maximum region PN by the display image setting unit 165 can be modified in various ways. For example, in the third embodiment, when a user is encouraged to use a wrench which is a tool by performing a change from the image of FIG. 21 to the image of FIG. 22, and when tools (for example, driver) other than the wrench are detected from an image of the outside scenery SC, the display image setting unit 165 may cause a moving image for encouraging a change of the tool to be displayed in the image display maximum region PN. In this modification example, a user can be caused to visually recognize that tools used for work to be performed are different from each other, and thus a user's convenience is improved. Meanwhile, in this modification example, the moving image for encouraging a change of the tool is equivalent to a second moving image in the aspect of the invention.

D-3. Modification Example 3

In the above-mentioned embodiment, the operating unit 135 is formed in the control unit 10, but the aspect of the operating unit 135 can be modified in various ways. For example, an aspect in which a user interface, formed separately from the control unit 10, which is the operating unit 135 may be used. In this case, since the operating unit 135 is formed separately from the control unit 10 in which the power supply 130 or the like is formed, a reduction in size can be achieved, and thus a user's operability is improved. In addition, the camera 61 is disposed in the image display unit 20, but the camera 61 is formed separately from the image display unit 20, and may be able to capture an image of the outside scenery SC. In addition, the HMD 100 in which both the CPU 140 and the power supply 130 constituting the control unit 10 are mounted in the image display unit 20 may be formed. In this HMD 100, since a controller which is formed separately from the image display unit 20 is not present, a further reduction in size can be achieved. In addition, the CPU 140 is mounted in each of the control unit 10 and the image display unit 20, and thus the control unit 10 may be used as a single controller, and the image display unit 20 may be used as a single display device.

For example, the image light generation unit may be configured to include an organic EL (Electro-Luminescence) display and an organic EL control unit. In addition, for example, the image light generation unit can also use LCOS (Liquid crystal on silicon; LCOS is a Registered Trademark), a digital micro-mirror device or the like, instead of an LCD. In addition, for example, the aspect of the invention can also be applied to a laser retinal projection-type HMD 100. In addition, the image display maximum region PN may be constituted by a MEMS shutter-type display in which a MEMS shutter formed in each pixel is opened and closed.

In addition, for example, the HMD 100 may be formed as a head mounted display of an aspect in which the optical image display unit covers only a portion of a user's eyes, in other words, an aspect in which the optical image display unit does not completely cover a user's eyes. In addition, the HMD 100 may be formed as a so-called monocular head mounted display. In addition, instead of the HMD 100, a hand-held display which is not mounted on a user's head and in which the position thereof is fixed by a user's hands like binoculars may be used as an image display device. In addition, the HMD 100 is formed as a binocular optical transmission type, but the aspect of the invention can also be applied similarly to, for example, head mounted displays of other types such as a video transmission type.

In addition, the HMD 100 may be used as a display device only for displaying an image based on an image signal which is received from other devices. Specifically, the HMD may be used as a display device equivalent to a monitor of a desktop PC. For example, an image may be displayed in the image display maximum region PN of the image display unit 20 by receiving an image signal from the desktop PC.

In addition, the HMD 100 may be used so as to function as a portion of a system. For example, the HMD 100 may be used as a device for executing a function of a portion of a system including an airplane. A system having the HMD 100 used therein may be a system including an automobile, a bicycle or the like without being limited to the system including an airplane.

In addition, the earphones may have an ear cover type or a head band type adopted therein, and may be omitted. In addition, for example, the earphones may be configured as a head mounted display which is mounted in a vehicle such as an automobile or an airplane. In addition, for example, the earphones may be configured as a head mounted display which is built into a body protector such as a helmet.

D-4. Modification Example 4

The configuration of the HMD 100 in the above-mentioned embodiment is merely exemplified, and can be modified in various ways. For example, the direction key 16 provided in the control unit 10 may be omitted, or other interface for operation such as a stick for operation may be provided in addition to the direction key 16 or the track pad 14. In addition, the control unit 10 is configured to be capable of being connecting an input device such as a keyboard or a mouse, and may be configured to accept an input from a keyboard or a mouse.

In addition, as the image display unit, image display units of other types such as an image display unit which is worn like, for example, a cap may be adopted instead of the image display unit 20 which is worn like spectacles. In addition, the earphones 32 and 34 can be appropriately omitted. In addition, in the above-mentioned embodiment, an LCD and a light source are used as a configuration in which image light is generated, other display elements such as an organic EL display may be adopted instead of these components.

Figure 26A:
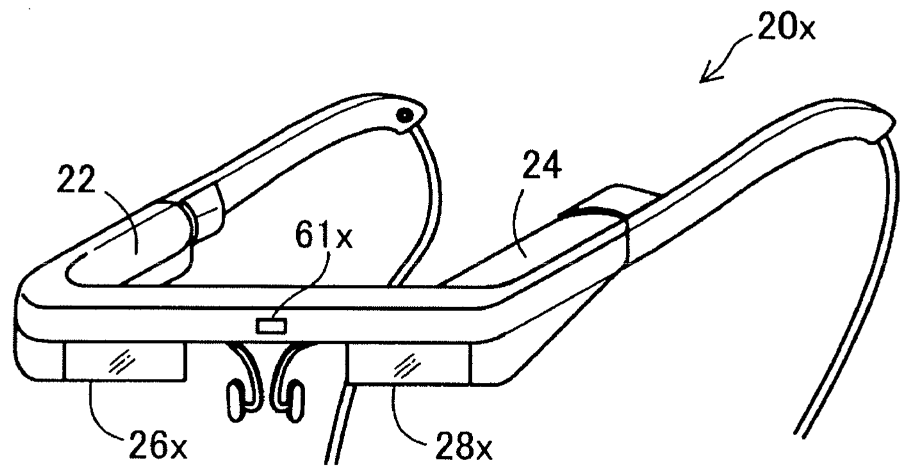
FIGS. 26A and 26B are diagrams illustrating an appearance configuration of an HMD of a modification example.
Figure 26B:
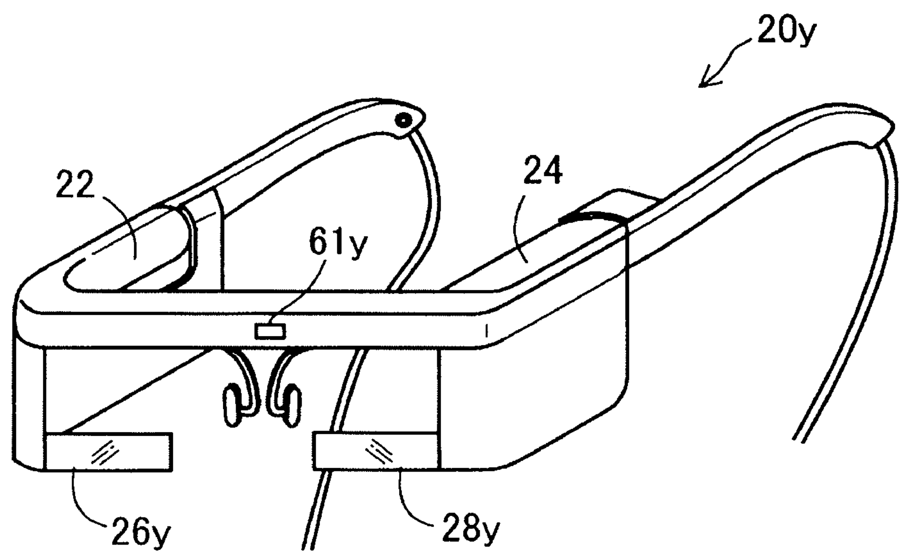

FIGS. 26A and 26B are diagrams illustrating a configuration of an appearance of an HMD in a modification example. In an example of FIG. 26A, a difference from the HMD 100 shown in FIG. 1 is in that an image display unit 20*x* includes a right optical image display unit 26*x* instead of the right optical image display unit 26, and includes a left optical image display unit 28*x* instead of the left optical image display unit 28. The right optical image display unit 26*x* is formed so as to be smaller than the optical member of the above-mentioned embodiment, and is disposed obliquely upward to a user's right eye during the mounting of an HMD 100*x*. Similarly, the left optical image display unit 28*x* is formed so as to be smaller than the optical member of the above-mentioned embodiment, and is disposed obliquely upward to a user's left eye during the mounting of the HMD 100*x*. In an example of FIG. 26B, a difference from the HMD 100 shown in FIG. 1 is in that an image display unit 20*y* includes a right optical image display unit 26*y* instead of the right optical image display unit 26, and includes a left optical image display unit 28*y* instead of the left optical image display unit 28. The right optical image display unit 26*y* is formed so as to be smaller than the optical member of the above-mentioned embodiment, and is disposed obliquely downward to a user's right eye during the mounting of the head mounted display. The left optical image display unit 28*y* is formed so as to be smaller than the optical member of the above-mentioned embodiment, and is disposed obliquely downward to a user's left eye during the mounting of the head mounted display. In this manner, the optical image display unit may be sufficient to be disposed in the vicinity of a user's eyes. In addition, the size of the optical member forming the optical image display unit is arbitrary, and the optical image display unit can be implemented as the HMD 100 in an aspect in which only a portion of a user's eyes is covered. In other words, the optical image display unit can be implemented as the HMD 100 in an aspect in which a user's eyes are not completely covered.

In addition, in the above-mentioned embodiment, the HMD 100 may cause a user to visually recognize a two-dimensional image by guiding image light indicating the same image to a user's right and left eyes, and may cause a user to visually recognize a three-dimensional image by guiding image light indicating a different image to a user's right and left eyes.

In addition, in the above-mentioned embodiment, a portion of a configuration implemented by hardware may be replaced with software. On the contrary, a portion of a configuration implemented by software may be replaced with hardware. For example, in the above-mentioned embodiment, the image processing unit 160 and the voice processing unit 170 are implemented by the CPU 140 reading out and executing a computer program, but these functional units may be implemented by a hardware circuit.

In addition, when some or all of the functions of the invention are implemented by software, the software (computer program) can be provided in a form in which it is stored in a computer readable recording medium. In the invention, the "computer readable recording medium" is not limited to a portable recording medium such as a flexible disk or a CD-ROM, and also includes an internal storage device, such as various RAMs or ROMs, located within a computer, or an external storage device, such as a hard disk, which is fixed to a computer.

In addition, in the above-mentioned embodiments, as shown in FIGS. 1 and 2, the control unit 10 and the image display unit 20 are formed as a separate configuration, but the configurations of the control unit 10 and the image display unit 20 can be modified in various ways without being limited thereto. For example, all the components formed in the control unit 10 may be formed in the image display unit 20, and some of the components may be formed therein. In addition, the power supply 130 in the above-mentioned embodiment may be a component capable of being replaced so as to be independently formed, and components formed in the control unit 10 may also be formed in the image display unit 20 redundantly. For example, the CPU 140 shown in FIG. 2 may be formed in both the control unit 10 and the image display unit 20, and functions performed by the CPU 140 formed in the control unit 10 and the CPU formed in the image display unit 20 may be divided separately.

The invention is not limited to the aforementioned embodiments and modification examples of this specification, and can be implemented by various configurations within the gist of the invention. For example, technical features in the embodiments and modification examples which correspond to the technical features in the respective aspects described in the summary of the invention can be appropriately replaced or combined in order to solve some or all of the aforementioned problems, or to achieve some or all of the aforementioned effects. Also, the technical features can be removed appropriately unless otherwise specified in the specification to be essential.

What is claimed is:

1. A head mounted display (HMD) comprising:

a display that is capable of displaying a generated image and that is at least one of: an optical transmission type display capable of transmitting outside scenery through the display and a video transmission type display that is capable of displaying the outside scenery via video transmission; and a processor or circuit configured to:

obtain one or more images of the outside scenery captured by a camera;

detect from the one or more captured images of the outside scenery, a first target which has been previously-associated with a specific scenario;

determine a first moving image associated with the specific scenario previously-associated with the first target; and control the display to display the first moving image which is a scenario moving image associated with the first target.

2. The HMD of claim 1, wherein the specific scenario is for at least one of: working on the detected first target, lecturing about the detected first target, and using the detected first target.

3. The HMD of claim 1, wherein the processor or circuit is further configured to control the display to display the first moving image in association with a position of the detected first target.

4. The HMD of claim 1, further comprising the camera that captures the one or more images of the outside scenery.

5. The HMD of claim 1, wherein the first moving image is a moving image relevant to a work scenario in which specific work is to be performed on the detected first target.

6. The HMD of claim 1, wherein the processor or circuit is further configured to:

detect a second target that is different from the first target from the outside scenery, and when the second target is detected during the display of the first moving image on the display, control the display to stop displaying the first moving image and instead display a second moving image which is a moving image that is different from the first moving image and that is associated with the detected second target.

7. The HMD of claim 6, wherein the first moving image is a moving image relevant to a work scenario in which specific work is to be performed on the detected first target, and the second moving image is a moving image relevant to a work scenario in which specific work is recommended to be next performed by a user after the work which is performed on the detected first target has begun.

8. The HMD of claim 6, wherein the second moving image is a moving image indicating that the detected second target is not a target to be used for work which is to be performed on the detected first target.

9. The HMD of claim 1, further comprising a microphone, wherein the processor or circuit is further configured to:

cause the microphone to acquire an external voice, and control the display to display an image on the basis of a combination of the detected first target and the acquired voice.

10. The HMD of claim 1, further comprising a speaker, wherein the processor or circuit is further configured to cause the speaker to output a voice associated with the first moving image when the first moving image is displayed on the display.

11. The HMD of claim 1, further comprising a biological information sensor that acquires biological information of a user, wherein the processor or circuit is further configured to control the display to display the first moving image on the basis of the detected first target and the acquired biological information of the user.

12. The HMD of claim 1, wherein the association of the detected first target with the first moving image is based on at least one of: a kind of the detected first target, a movement of the detected first target, a position of the detected first target in the outside scenery, and a direction of the detected first target.

13. The HMD of claim 1, wherein the processor or circuit is further configured to:

detect a second target and movement of the second target; and determine whether or not the user of the HMD has completed work that is performed on or with the detected second target, based on movement detected in relation to the detected second target.

14. A processor or circuit for use in a head mounted display device, the processor or circuit configured to:

obtain one or more images;

detect, from the one or more images, a first target which has been previously-associated with a specific scenario;

determine a first moving image associated with the specific scenario previously-associated with the first target; and control a display of the head mounted display device to display the first moving image which is a scenario moving image associated with the first target.

15. A display system comprising:

a memory;

a display that is capable of displaying a generated image and that is at least one of: an optical transmission type display capable of transmitting outside scenery through the display and a video transmission type display that is capable of displaying the outside scenery via video transmission; and a processor or circuit configured to:

obtain one or more images of the outside scenery captured by a camera;

detect from the one or more captured images of the outside scenery, a first target which has been previously-associated with a specific scenario;

determine a first moving image associated with the specific scenario previously-associated with the first target; and control the display to display the first moving image which is a scenario moving image associated with the first target.

16. A method comprising:

obtaining, by a processor or circuit, one or more images of an outside scenery captured by a camera;

detecting, by the processor or circuit, from the one or more captured images of the outside scenery, a first target which has been previously-associated with a specific scenario;

determining, by the processor or circuit, a first moving image associated with the specific scenario previously-associated with the first target; and controlling, by the processor or circuit, a display to display the first moving image which is a scenario moving image associated with the first target, wherein the display is a display that is capable of displaying a generated image and that is at least one of: an optical transmission type display capable of transmitting the outside scenery through the display and a video transmission type display that is capable of displaying the outside scenery via video transmission.

17. A non-transitory computer readable medium comprising computer-executable program instructions that, when executed by a computer, cause the computer to:

obtain one or more images of the outside scenery captured by a camera;

detect from the one or more captured images of the outside scenery, a first target which has been previously-associated with a specific scenario;

determine a first moving image associated with the specific scenario previously-associated with the first target; and control the display to display the first moving image which is a scenario moving image associated with the first target, wherein the display is a display that is capable of displaying a generated image and that is at least one of: an optical transmission type display capable of transmitting outside scenery through the display and a video transmission type display that is capable of displaying the outside scenery via video transmission.

18. The HMD of claim 1, wherein the processor or circuit is further configured to: cause a position-adjusted image for encouraging the change of a user's position to be displayed in the display.

19. The HMD of claim 1, wherein the processor or circuit is further configured to: determine whether a user performs a recommended operation to be performed by the user depending on the first moving image.

20. The HMD of claim 19, wherein the processor or circuit is further configured to:

when it is determined that a recommended operation is not performed, wait for the performing of the recommended operation, and when it is determined that the recommended operation has been performed, determine whether a detection target associated with an operation to be performed by a user is present after the recommended operation performed in the specific scenario is executed.

21. The HMD of claim 1, wherein the processor or circuit is further configured to: when it is determined that an augmented reality (AR) scenario corresponding to the specific scenario is not stored in a server, capture an image of outside scenery through another camera.

* * * * *